(12) United States Patent
Moss et al.

(10) Patent No.: US 6,294,122 B1
(45) Date of Patent: Sep. 25, 2001

(54) ELECTRIC ACTUATOR FOR A MELT FLOW CONTROL PIN

(75) Inventors: Mark Moss, Boxford; David Kazmer; James R. Rinderle, both of Amherst; Christopher Lee, Burlington, all of MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

(21) Appl. No.: 09/187,974

(22) Filed: Nov. 6, 1998

Related U.S. Application Data
(60) Provisional application No. 60/090,750, filed on Jun. 26, 1998.

(51) Int. Cl.[7] ................................................. B29C 45/23
(52) U.S. Cl. ...................... 264/328.9; 425/564; 425/566
(58) Field of Search ................................. 425/562, 563, 425/564, 565, 566, 572, 573

(56) References Cited

U.S. PATENT DOCUMENTS

| | | |
|---|---|---|
| 4,389,002 | 6/1983 | Devellian et al. . |
| 5,492,467 | 2/1996 | Hume et al. . |
| 5,545,028 | 8/1996 | Hume et al. . |
| 5,554,395 | 9/1996 | Hume et al. . |
| 5,556,582 | 9/1996 | Kazmer . |
| 5,674,439 | 10/1997 | Hume et al. . |
| 5,871,786 | 2/1999 | Hume et al. . |
| 5,885,628 | 3/1999 | Swenson et al. . |
| 5,894,025 | 4/1999 | Lee et al. . |
| 5,916,605 | 6/1999 | Swenson et al. . |
| 5,948,448 | 9/1999 | Schmidt . |
| 5,948,450 | 9/1999 | Swenson et al. . |
| 5,980,237 | 11/1999 | Swenson et al. . |

FOREIGN PATENT DOCUMENTS

| | | |
|---|---|---|
| 196 08 676 C1 | 1/1997 | (DE) . |
| 0 967 063 A1 | 12/1999 | (EP) . |

OTHER PUBLICATIONS

Up 06114887 A (Mitsubishi Materials Corp), Apr. 26, 1994 (1994–04226).
JP 63 166511 A (Nissei Plastics Ind Co), Jul. 9, 1988 (1988–07–09).

*Primary Examiner*—Tim Heitbrink
(74) *Attorney, Agent, or Firm*—Wolf, Greenfield & Sacks, P.C.

(57) ABSTRACT

In an injection molding machine, an apparatus for controlling movement of a pin comprising a plastic melt flow channel having an output end for delivering molten plastic injected into the channel under pressure to a mold cavity, wherein the pin comprises an elongated rod having an axis and an end, the pin being slidably mounted within the channel for movement along its axis within the channel, an electrically driven motor drivably interconnected to an actuating mechanism, wherein the actuating mechanism is drivably interconnected to the end of the pin, the motor being controllably drivable to drive the pin through movement along its axis within the channel

35 Claims, 14 Drawing Sheets

ELECTRIC ACTUATOR FOR A MELT FLOW CONTROL PIN

This application claims the benefit of the prior filed copending provisional application entitled, "An Electric Actuation Mechanism For Valve Gating Of Hot Runners In Injection Molding", Serial No. 60/090,750, filed Jun. 26, 1998 by Mark Moss and David Kazmer.

BACKGROUND

The present invention relates to pin movement control mechanisms in injection molding machines and more particularly to electrically powered actuating mechanisms for axial drive of pin mechanisms which are disposed in a melt flow channel in an injection molding apparatus. Hydraulic and pneumatic actuators have traditionally been used to control the movement of a pin used, for example in a valve, in injection mold apparati due to the high pressures under which molten polymer is injected into the mold cavity such pressures typically being in excess of 50 MPa, e.g. around 100 Mpa and in high pressure molding in excess of 200 Mpa. Such conventional actuators are complex in design, maintenance intensive, bulky in size and relatively undesirable in environments of higher cleanliness.

SUMMARY OF THE INVENTION

In accordance with the invention therefore, in injection molding machines and processes, there is provided an axially slidable pin which is driven in a predetermined path of axial travel by an actuator which is driven by electrical power, the actuator being drivably interconnected to the pin. The actuator may comprise a mechanism which is drivably interconnected to the rotor of an electrically powered motor (either coaxially along an axis of the rotor or via some other non-coaxial interconnection such as a bevel gear, worm gear, rack/pinion/gear, multiple gear or other interconnection) the driven actuator, in turn, driving movement of the pin. A frameless motor or a motor having a shaft may be utilized. The apparatus preferably includes a mechanism for absorbing forces which may be transmitted from the pin to the rotor of the motor along its axis. The invention may include a controller which receives signals generated by one or more sensors which sense selected conditions of the molten plastic, the controller utilizing the signals according to a predetermined algorithm and controlling the drive of the electrically driven actuator according to the algorithm.

Apparatuses and methods according to the invention may or may not include a motor drive controller and the controller may have an algorithm which does or does not utilize signals/data which are representative of sensed conditions of the melt or the machine components.

In the most preferred embodiments described herein, axial forces to which the pin is subjected are transmitted to the actuating mechanism without loading the rotor of the drive motor along its axis. In embodiments where the motor rotor is coaxially aligned with the axis of the reciprocating pin, a force absorbing mechanism is preferably used to absorb the load which would otherwise be transmitted to the motor along its axis.

More particularly, there is provided in an injection molding machine, an apparatus for controlling movement of a pin comprising:

a plastic melt flow channel having an output end for delivering molten plastic injected into the channel under pressure to a mold cavity, wherein the pin comprises an elongated rod having an axis and an end, the pin being slidably mounted within the channel for movement along its axis within the channel, an electrically driven motor drivably interconnected to an actuating mechanism, wherein the actuating mechanism is drivably interconnected to the end of the pin, the motor being controllably drivable to drive the pin through movement along its axis within the channel.

The motor may include a rotatably driven rotor which translates motion to the pin to drive the pin along its axis without rotation. The pin is typically subjected to forces along its axis wherein the actuating mechanism is interconnected to the end of the pin such that the axial forces to which the pin is subjected are transmitted between the pin and the actuating mechanism without absorption of the axial forces. The apparatus may include a force absorbing member which absorbs forces transmitted to the rotor of the motor along its axis. The actuating mechanism may comprise a screw and a complementary nut screwably engaged with each other, at least one of the screw and the nut being drivably interconnected to the motor to travel along a predetermined path of travel, the pin being simultaneously driven along its axis through a path of travel according to the predetermined path of travel of the screw or the nut.

The motor may be connected to a controller having a program for driving the movement of the actuating mechanism according to one or more sensed conditions of the molten plastic or the injection molding machine. The controller may include a PID (proportional, integral, derivative) controller. Protocols other than PID may be utilized. The program for driving the movement of the actuating mechanism typically includes an algorithm utilizing a value representative of one or more of the pressure, temperature, viscosity and flow rate of the molten plastic, the position of a component of the machine and the time or time lapse of operation of the machine or a component of the machine. The apparatus may include a sensor which senses a selected condition of the molten plastic or the injection molding machine and which generates signals representative of the sensed property, the controller having a program which controls the motor according to the generated signals. The apparatus may also include a recorder or sensor or monitor which measures, records or monitors the position of a component of the machine or the time or time lapse of the operation of the machine or a component of the machine.

There is further provided, in an injection molding machine, a plastic melt flow control valve apparatus comprising:

a plastic melt flow channel having an output end for delivering molten plastic injected into the channel under pressure to a mold cavity;

an elongated valve pin having an axis and an end, the pin being slidably mounted within the channel for movement along its axis within the channel to control flow of the molten plastic;

an electrically driven motor drivably interconnected to an actuating mechanism, wherein the actuating mechanism is interconnected to the end of the pin, the motor being controllably drivable to drive the pin through movement along its axis within the channel.

There is further provided in an injection molding machine having a plastic melt flow channel with a pin slidably mounted within the channel, wherein the channel has an output end for delivering molten plastic injected into the channel under pressure to a mold cavity, and wherein the pin comprises an elongated rod having an axis and an end, the pin being slidably mounted for movement along its axis within the channel, a method for controllably driving movement of the pin along its axis comprising:

drivably interconnecting a rotatable rotor of an electrically driven motor to an actuating mechanism which is drivably movable along a predetermined path of travel;

interconnecting the actuating mechanism to the end of the pin such that movement of the actuating mechanism along its predetermined path of travel simultaneously moves the pin along its axis according to a predetermined path of travel;

controllably driving the motor to controllably drive the actuating mechanism and to controllably drive the pin through its predetermined path of travel within the channel.

The rotor of the motor most preferably translates rotational force to the pin to move the pin along its predetermined path of travel without rotation of the pin. The method may comprise interconnecting the actuating mechanism to the end of the pin such that the axial forces to which the pin is subjected are transmitted between the pin and the actuating mechanism with or without absorption of the forces.

The method may further comprise sensing one or more conditions of the molten plastic selected from the group consisting of pressure, temperature, viscosity, force and flow rate of the molten plastic or recording or measuring one or more of the position of a component of the machine or the time or time lapse of the operation of the machine or a component of the machine and controlling the drive of the motor according to a predetermined algorithm utilizing a value for the sensed conditions and/or the recorded/measured positions or times.

There is also provided in an injection molding system, a method of opening and closing a gate leading to a mold cavity comprising controllably driving, with an electrically powered motor, a pin which is slidably mounted within a channel leading to the gate along a predetermined path of axial travel in which the gate is closed by the pin in at least one position and opened by the pin in at another position along the predetermined path of travel.

There is also provided in an injection molding system, a method of dynamically altering the flow of molten plastic in a melt flow channel comprising controllably driving, with an electrically powered motor, a pin which is slidably mounted within the melt flow channel along a predetermined path of axial travel in which the flow of the melt through the channel varies according to the position of the pin along the predetermined path of travel.

In alternative embodiments, the pin may be interconnected to the rotor of the electrically powered motor such that the pin is rotatable and the mechanism for controlling flow of plastic within the melt flow channel may comprise may comprise plate, cam or other mechanisms which are drivable to open and close the gate or other flow passage leading to the mold cavity or to otherwise vary the rate of flow through the melt flow channel leading to the gate or other flow passage to the mold cavity.

BRIEF DESCRIPTION OF THE DRAWINGS

The invention is described more fully below with reference to the following drawings which depict examples of the invention for purposes of explanation, wherein.

DETAILED DESCRIPTION OF THE INVENTION

Figure 1:
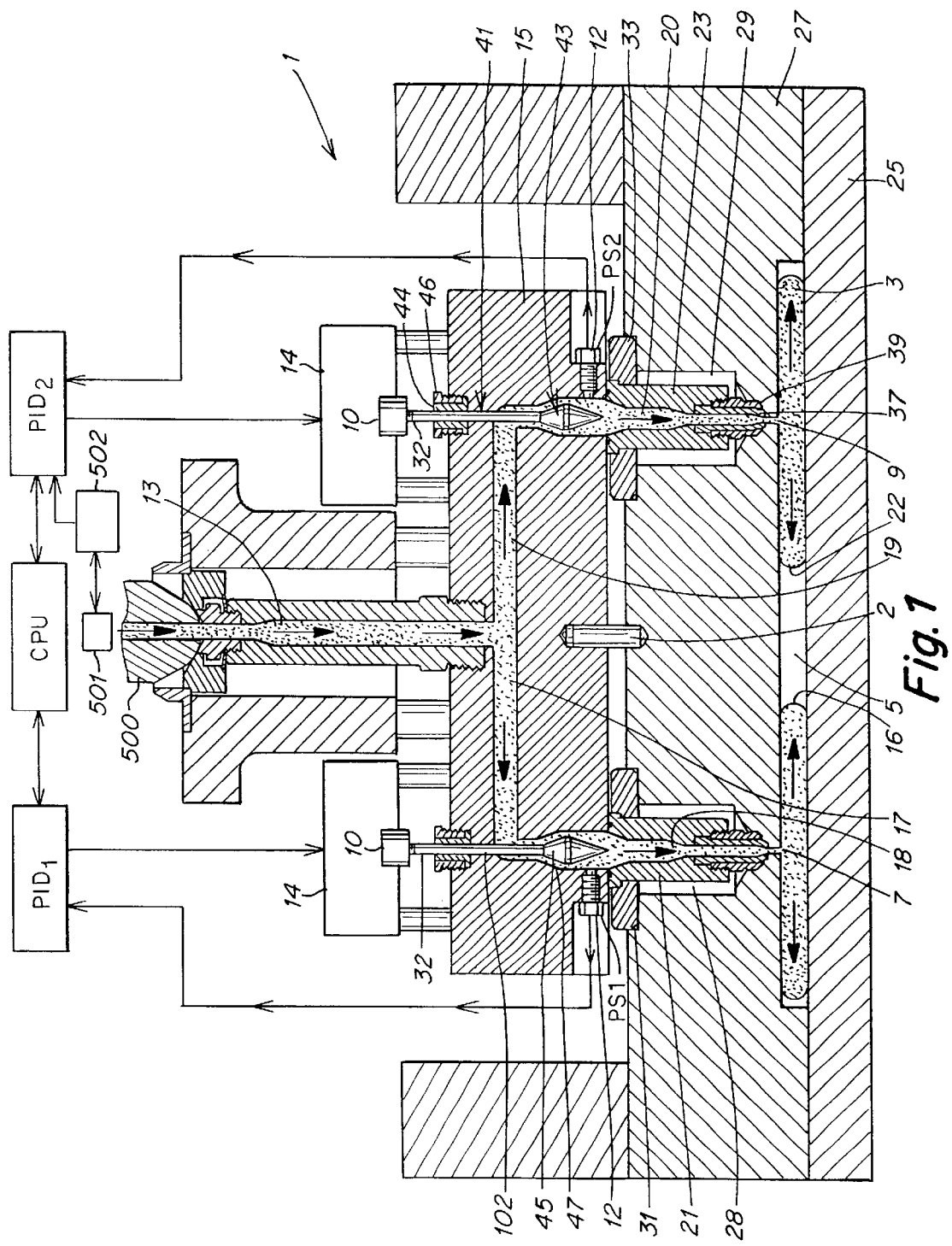
FIG. 1 is a schematic side cross sectional view of one example of an injection molding apparatus in which an apparatus or process according to the invention may be incorporated.
Figure 1A:
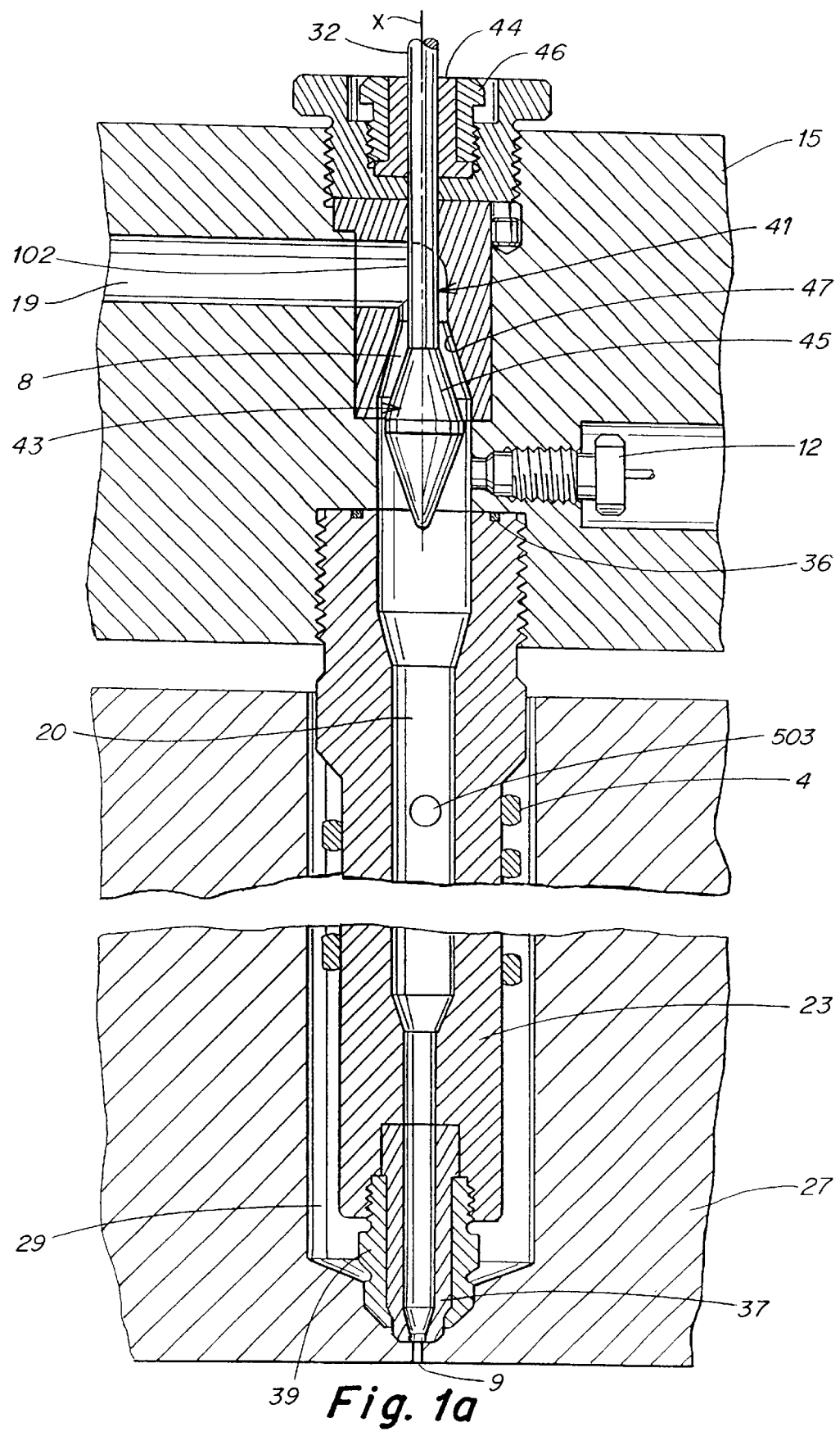
FIG. 1a is a side cross-sectional view of one example of a nozzle configuration usable in the invention and as used in the FIG. 1 injection molding machine showing a pin head element controlling melt flow at a position uspstream from the gate.

FIGS. 1, 1a show an embodiment of an injection molding system in which the invention might typically be incorporated. The injection molding system 1 is a multi-gate single cavity system in which melt material 3 is injected into a cavity 5 from gates 7 and 9. Melt material 3 is injected from an injection molding machine 11 through an extended inlet 13 and into a manifold 15. Manifold 15 distributes the melt through channels 17 and 19. Although a hot runner system is shown in which plastic melt is injected, the invention is applicable to other types of injection systems in which it is useful to control the rate at which a material (e.g., metallic or composite materials) is delivered to a cavity.

Melt is injected into the system by a screw or otherwise under high pressure. The plastic melt is distributed by the manifold 15 through channels 17 and 19 and into bores 18 and 20 of nozzles 21 and 23, respectively. Melt is injected out of nozzles 21 and 23 and into cavity 5 (where the part is formed) which is formed by mold plates 25 and 27. Although a multi-gate single-cavity system is shown, the invention is not limited to this type of system, and is also applicable to, for example, multi-cavity systems, as discussed in greater detail below.

The injection nozzles 21 and 23 are received in respective wells 28 and 29 formed in the mold plate 27. The nozzles 21 and 23 are each seated in support rings 31 and 33. The support rings serve to align the nozzles with the gates 7 and 9 and insulate the nozzles from the mold (in the FIG. 1a embodiment the nozzles are seated via threaded bushings). The manifold 15 sits atop the rear end of the nozzles and maintains sealing contact with the nozzles via compression forces exerted on the assembly by clamps (not shown) of the injection molding machine. An O-ring 36 is provided to prevent melt leakage between the nozzles and the manifold. A dowel 2 centers the manifold on the mold plate 27. Dowels 32 and 34 prevent the nozzle 23 and support ring 33, respectively, from rotating with respect to the mold 27.

The nozzles may also include a heater 4, FIG. 1a. Although an electric coil heater is shown, other heaters may be used. Furthermore, heat pipes (for example those disclosed in U.S. Pat. No. 4,389,002) may be disposed in each nozzle and used alone or in conjunction with heater 4. The heater is used to maintain the melt material at its processing temperature up to the gates 7 and 9. As shown, the nozzles 21 and 23 also include an insert 37 and a tip 39. The insert can be made of a material (for example beryllium copper) having high thermal conductivity in order to maintain the melt at its processing temperature up to the gate by imparting heat to the melt from the heater 35. The tip 39 is used to form a seal with the mold plate 27 and is preferably a material (for example titanium alloy or stainless steel) having low thermal conductivity so as to reduce heat transfer from the nozzle to the mold.

In the embodiment shown in FIGS. 1, 1a valve pin 41 having a head 43 is used to control the rate of flow of the melt material to the respective gates 7 and 9. The valve pin 41 is slidably movable along its axis X such that it may be driven in a reciprocal fashion along its axis X within melt flow channel 18, 20 which leads to gate 7, 9. The pins are subjected to force along X by the pressure of the melt within the flow channels 17, 19, 20, 21. The stems 102 of the valve pins are slidable within a valve pin bushing 44 which also serves to prevent melt from leaking along stem 102 of the valve pin out of channels 17, 19, 20, 21. As shown, the valve pin 41 has an end 32 for connecting to an actuator 10 (shown in FIG. 1 as a schematic representation) which is drivably interconnected outside the body of the manifold or hot runner housing 15 to an electrically driven motor 14. The valve pin bushing 44 is held in place by a threadably mounted cap 46. The valve pin 41 may be completely opened at the beginning of the injection cycle and completely closed at the end of the cycle. Between the fully open and fully closed positions, the valve pin can assume intermediate positions between the fully open and closed positions, in order to variably decrease or increase the rate of flow of the melt through gap 8. As described below, an algorithm may be selected for controlling the movement of the pin according to any course of movement and, a fortifier, effecting any predetermined rate of melt flow and not necessarily simple stopping and starting of the melt flow, although a program for stopping and starting may also be employed (e.g by closing and opening gap 8, FIGS. 1, 1a or gap 30, FIG. 1b, or closing and opening the gate 34, FIGS. 1c, 1d). In the FIGS. 1, 1a embodiment, the head of the pin 41 includes a tapered portion 45 that forms a gap 8 with a surface 47 of the bore 17, 19 of the manifold. Increasing or decreasing the size of the gap by displacing the valve pin correspondingly increases or decreases the flow of melt material to the gate 9. When the valve pin is closed the tapered portion 45 of the valve pin head contacts and seals with the complementary surface 47 of the bore of the manifold.

In the embodiment shown in FIGS. 1, 1a to reduce the flow of melt, the pin 41 is retracted backwardly along its axis from the gate 7, 9 by an actuator 10, to thereby decrease the width of the gap 8 between the valve pin and the channel portion 17, 19 of the manifold.

In the FIGS. 1, 1a–c embodiments, a pressure transducer 12 is used to sense the pressure in the manifold bore 18–20 downstream of the valve pin head 43. The conditions sensed by the pressure transducer 12 associated with each nozzle are fed back to a control system that includes controllers PID 1 and PID 2 and a CPU shown schematically in FIG. 1. Although PID controllers are shown in the particular embodiment, other controllers utilizing protocols other than PID may be employed. The CPU executes a PID (proportional, integral, derivative) algorithm which compares the sensed pressure (at a given time) from the pressure transducer to a programmed target pressure (for the given time). The CPU instructs the PID controller to controllably drive the servomotors 14 which adjust the position of the valve pin along its axis X using the actuator 10 in order to mirror the target pressure for that given time. In this way a programmed target pressure profile for an injection cycle for a particular part for each gate 7 and 9 can be followed.

Although in the disclosed embodiment the sensed condition is pressure, other sensors and other sensed conditions such as temperature or viscosity of the melt flow or such as temperature or position of components of the machine can be used which relate to melt flow rate. The position of the valve pin or the load on the valve pin could be the sensed condition. The temperature of the machine barrel or the hot runner or the position of the machine injection screw could also be sensed for example. A position sensor or load sensor or temperature sensor could be used to feed back the sensed condition to the PID controller. The position or change in position of the screw 501 of the machine barrel 500, FIG. 1 which injects the molten plastic into the channels 17,19 could also be measured by a sensor or monitor 502 and such measurement used as an input into a predetermined control algorithm. Similarly, the time or time lapse or rate of operation of certain components of or functions being carried out by the machine 1 could be used as an input to a predetermined control algorithm such as the time or rate during, over or at which the screw 501 is being driven to inject molten plastic into the system. In the same manner as explained above, the CPU would use a PID algorithm to compare the sensed or recorded condition or operation to a programmed target position profile or load profile or temperature profile or viscosity profile or time profile or the like for the particular gate to the mold cavity, and adjust the position or movement of the valve pin accordingly. Melt flow rate could also be directly measured or sensed with a flow detector, e.g. flow detector 503, FIG. 1a, and used as an input to the program.

Melt flow rate is directly related to the pressure sensed in bore 20, 21. Thus, in the FIGS. 1, 1a embodiment using the controllers PID 1 and PID 2, the rate at which the melt flows into the gates 7 and 9 can be adjusted during a given injection molding cycle, according to the desired pressure profile. In the FIGS. 1, 1a embodiment, the pressure (and rate of melt flow) is decreased by retracting the valve pin and decreasing the width of the gap 8 between the valve pin and the manifold bore, while the pressure (and rate of melt flow) is increased by displacing the valve pin toward the gate 7,9 and increasing the width of the gap 8. The PID controllers control the axial movement of the pins 41 by sending instructions to the servomotors 14.

By controlling the pressure in a single cavity system (as shown in FIG. 1) it is possible to adjust the location and shape of the weld line formed when melt flow 16 from gate 7 meets melt flow 22 from gate 9 as disclosed in U.S. Pat. No. 5,556,582. However, the invention also is useful in a multi-cavity system. In a multi-cavity system the invention can be used to balance fill rates and packing profiles in the respective cavities. This is useful, for example, when molding a plurality of like parts in different cavities. In such a system, to achieve a uniformity in the parts, the fill rates and packing profiles of the cavities should be as close to identical as possible. Using the same programmed pressure profile for each nozzle, unpredictable fill rate variations from cavity to cavity are overcome, and consistently uniform parts are produced from each cavity.

Another use of the present invention is seen in a multi-cavity system in which the nozzles are injecting into cavities which form different sized parts that require different fill rates and packing profiles. In this case, different pressure profiles can be programmed for each respective controller of each respective cavity. Still another use is when the size of the cavity is constantly changing, i.e., when making different size parts by changing a mold insert in which the part is formed. Rather than change the hardware (e.g., the nozzle) involved in order to change the fill rate and packing profile for the new part, a new program is chosen by the user corresponding to the new part to be formed.

Figure 1B:
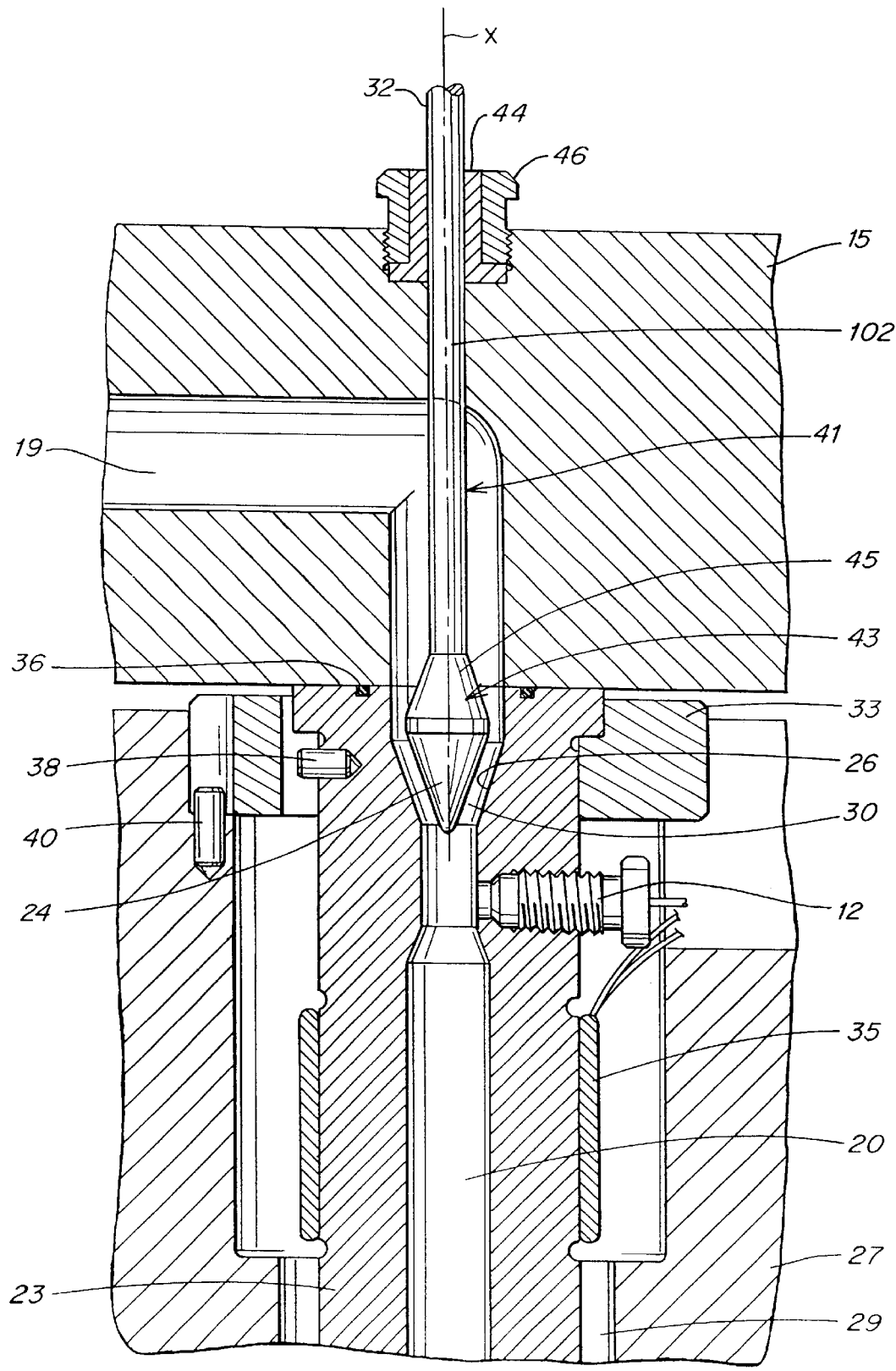
FIG. 1b is a side cross-sectional view of another example of a nozzle configuration usable in the invention.

FIG. 1b shows a typical alternative embodiment of a pin 41 having a head 43 with a distal cone shaped surface 24 which is matable with a complementary surface 26 by movement of the pin 41 forwardly toward the downstream gate. In the same manner as flow may be variably controlled through gap 8 in the FIG. 1a embodiment, flow may be variably controlled through gap 30 in the FIG. 1b embodiment by forward movement of pin 41. A band heater element 35 is shown in the FIG. 1b embodiment.

Figure 1C:
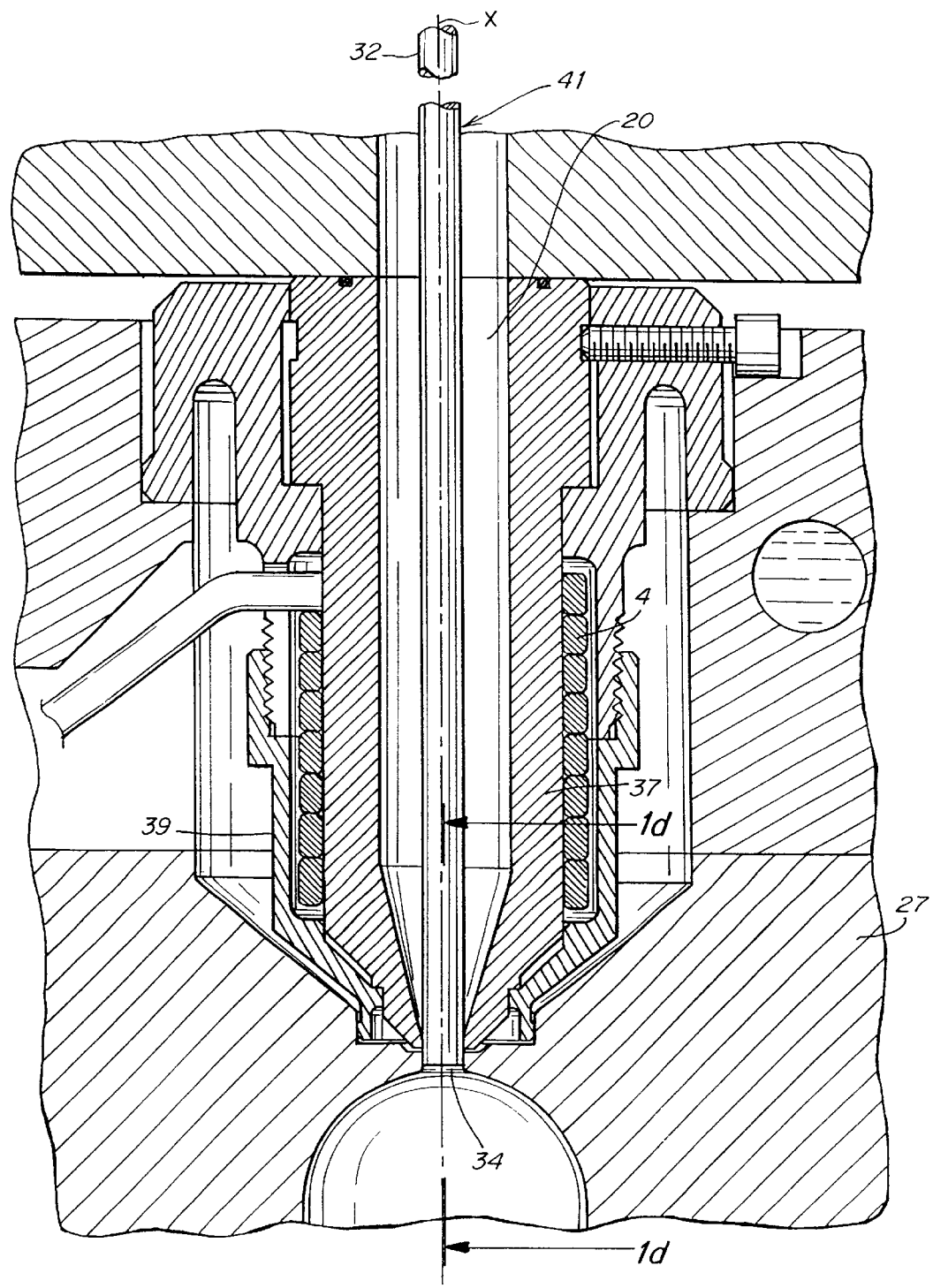
FIGS. 1c and 1d are side cross-sectional views of another example of a nozzle configuration usable in the invention.
Figure 1D:
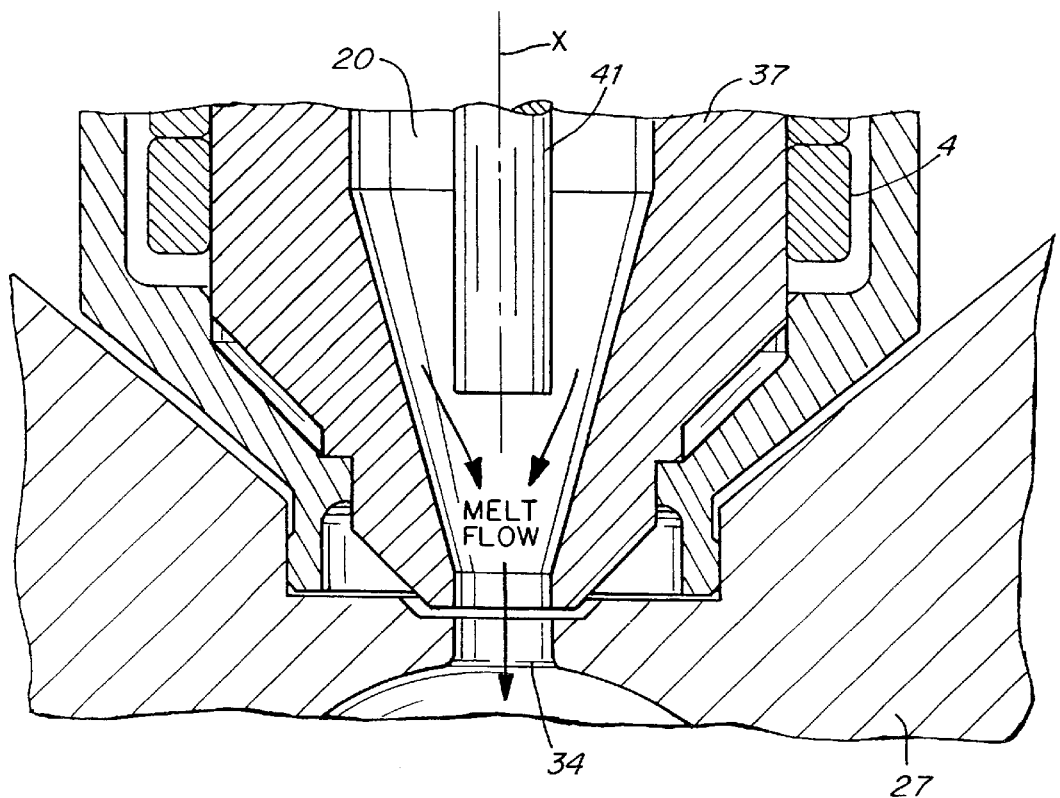

In the nozzle embodiments shown in FIGS. 1c, 1d the pin 41 is designed to simply close, FIG. 1c, or open, FIG. 1d, the gate 34 and the electrically driven motors as described herein may be controlled to effect such opening or closing by interconnection of an end 32 of the pin 41 to an actuating mechanism and controllable driving of pin 41 along its axis X.

Figure 1E:
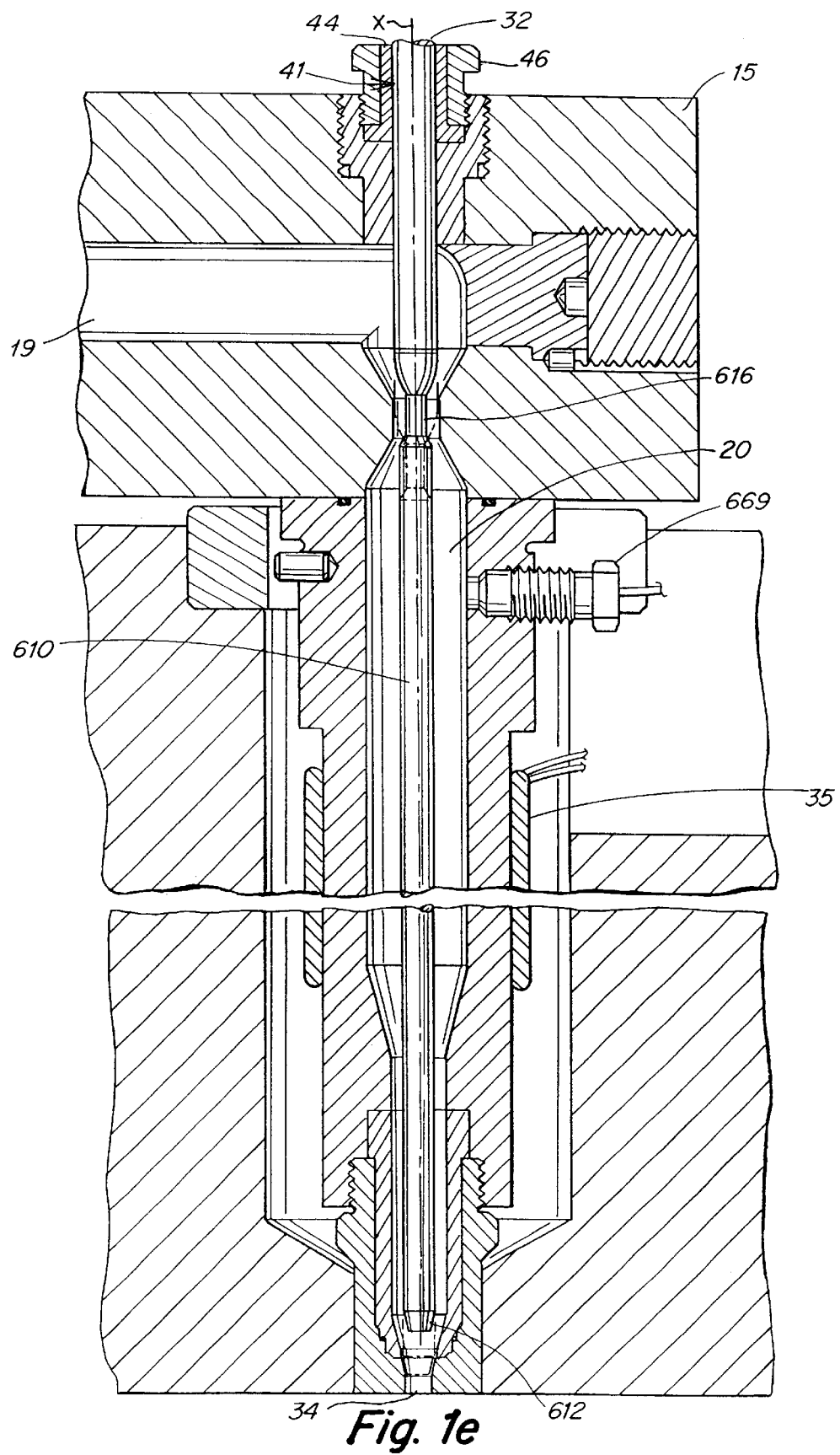
FIGS. 1e and 1f are side cross-sectional views of another example of a nozzle configuration usable in the invention.
Figure 1F:
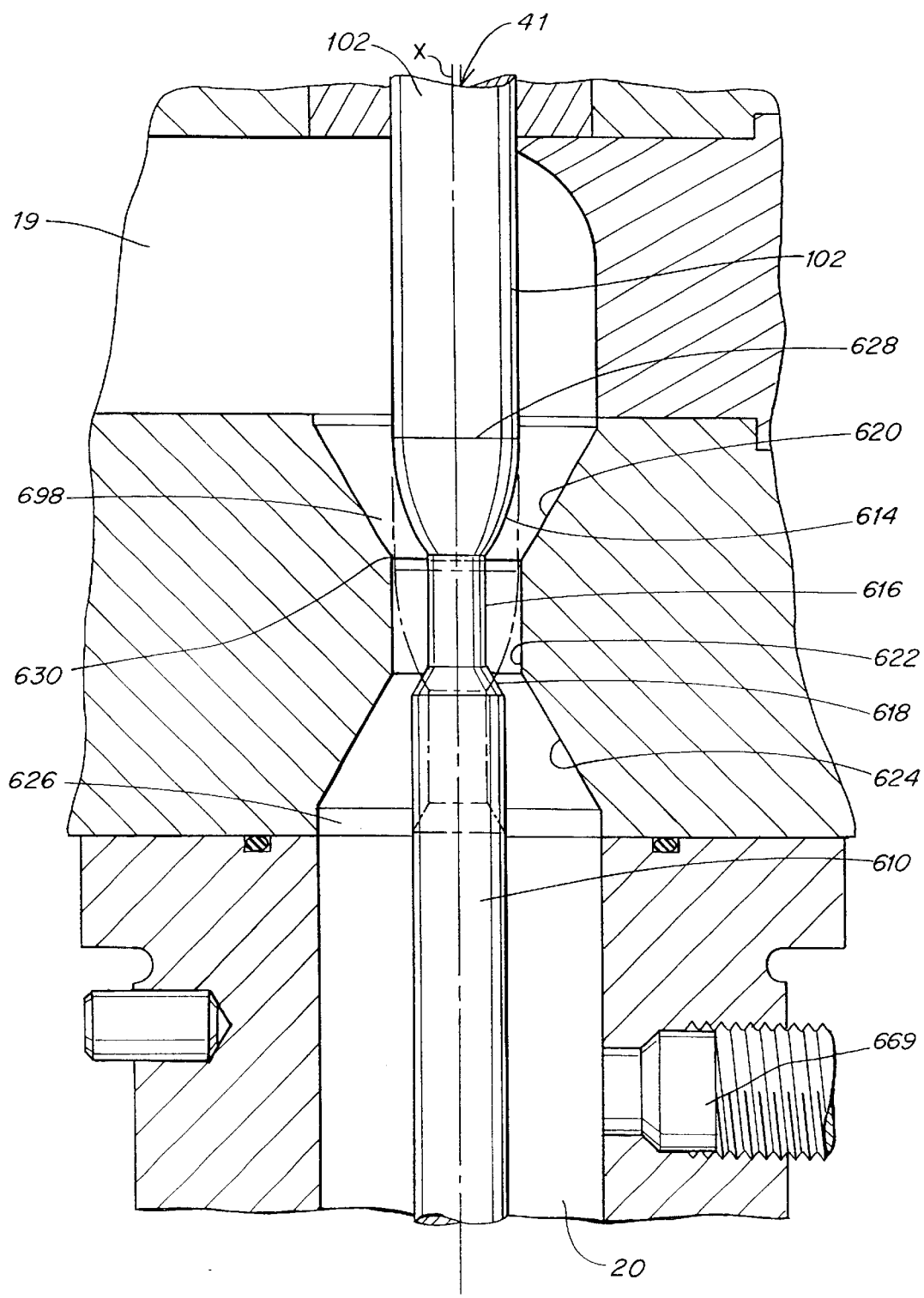

FIGS. 1e and 1f show another alternative nozzle for use in the invention having flow control in which the control of melt flow is still away from the gate as in the FIGS. 1, 1a, 1b embodiments. Use of the pressure transducer 669 and PID control system is the same as in previous embodiments. In this embodiment, however, the valve pin 41 extends past the area of flow control via extension 610 to the gate 34. The valve pin is shown in solid lines in the fully open position and in phantom dashed lines in the closed position. In addition to the flow control advantages away from the gate described above, the extended valve pin has the advantage of shutting off flow at the gate with a tapered pin end 612 of the valve pin 41.

Extending the valve pin as in the FIGS. 1e, 1f embodiment such that the end 612 closes the gate obviates leakage of plastic out of the nozzle at the end of the injection cycle (where in the FIGS. 1, 1a, 1b embodiment the gates 7,9 are not closed). The use of a valve pin shortens injection cycle time relative to thermal gating, i.e. where the nozzle does not utilize any valve pin whatsoever to close the gate or otherwise stop and start flow through a nozzle. In embodiments where thermal gating is used, plastication does not begin until the part from the previous cycle is ejected from the mold cavity. This prevents material from exiting the gate when the part is being ejected. When using a valve pin, however, plastication can be performed simultaneously with the opening of the mold when the valve pin is closed, thus shortening cycle time by beginning plastication sooner. Using a valve pin can also result in a smoother gate surface on the part.

The flow control area of the extended pin embodiment is shown enlarged in FIG. 1f. In solid lines the valve pin is shown in the fully open position in which maximum melt flow is permitted. The valve pin includes a convex surface 614 that tapers from edge 628 of the stem 102 of the valve pin 41 to a throat area 616 of reduced diameter. From throat area 616, the valve pin expands in diameter in section 618 to the extension 610 which extends in a uniform diameter to the tapered end 612 of the valve pin.

In the flow control area the manifold includes a first section defined by a surface 620 that tapers to a section of reduced diameter defined by surface 622. From the section of reduced diameter the manifold channel then expands in diameter in a section defined by surface 624 to an outlet of the manifold 626 that communicates with the channel section 20 of the nozzle.

In the FIGS. 1e, 1f embodiment flow control is achieved and melt flow reduced by moving the valve pin 41 forward toward the gate thereby reducing the width of the control gap 698. Thus, surface 614 approaches surface 620 of the manifold to reduce the width of the control gap and reduce the rate of melt flow through the manifold to the gate. To prevent melt flow from the channel section 19, and end the injection cycle, the valve pin is moved forward so that edge 628 of the valve pin, i.e., where the stem 102 meets the beginning of curved surface 614, will move past point 630 which is the beginning of surface 622 that defines the section of reduced diameter of the manifold bore 19. When edge 628 extends past point 630 of the manifold bore melt flow is prevented since the surface of the valve stem 102 seals with surface 622 of the manifold. The valve pin is shown in dashed lines where edge 628 is forward enough to form a seal with surface 622. At this position, however, the valve pin is not yet closed at the gate 34. To close the gate the valve pin moves further forward, with the surface of the stem 102 moving further along, and continuing to seal with, surface 622 of the manifold until the end 612 of the valve pin closes with the gate 34, FIGS. 1e, 1f.

In this way in the FIGS. 1e, 1f embodiment, the valve pin does not need to be machined to close the gate and the flow bore 19 of the manifold simultaneously, since stem 102 forms a seal with surface 622 before the gate is closed. Further, because the valve pin is closed after the seal is formed in the manifold, the valve pin closure will not create any unwanted pressure spikes. Likewise, when the valve pin is opened at the gate, the end 612 of the valve pin will not interfere with melt flow, since once the valve pin is retracted enough to permit melt flow through gap 698, the valve pin end 612 is a predetermined distance from the gate. The valve pin can, for example, travel 6 mm. from the fully open position to where a seal is first created between stem 102 and surface 622, and another 6 mm. to close the gate. Thus, the valve pin would have 12 mm. of travel, 6 mm. for flow control, and 6 mm. with the flow prevented to close the gate. Of course, the invention is not limited to this range of travel for the valve pin, and other dimensions can be used.

Figure 2A:
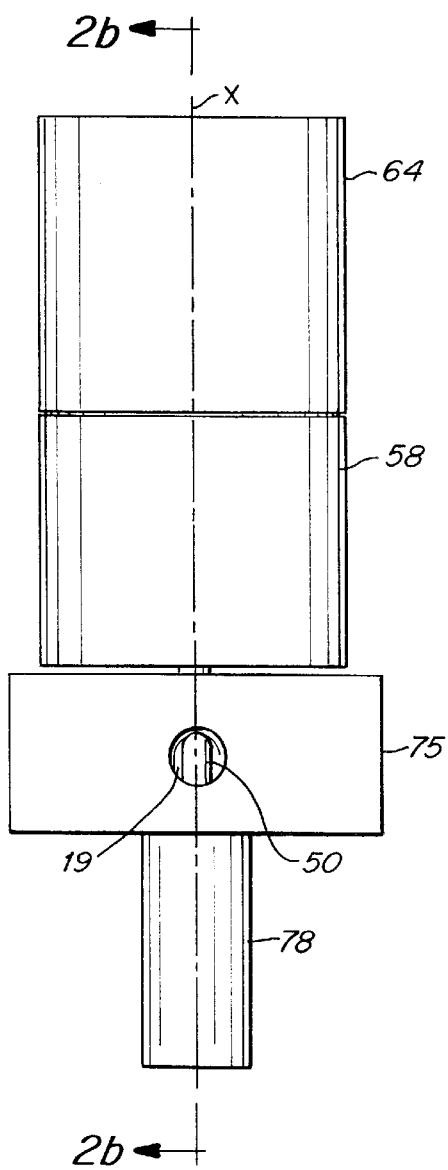
FIG. 2a is a side view of an apparatus according to the invention.
Figure 2B:
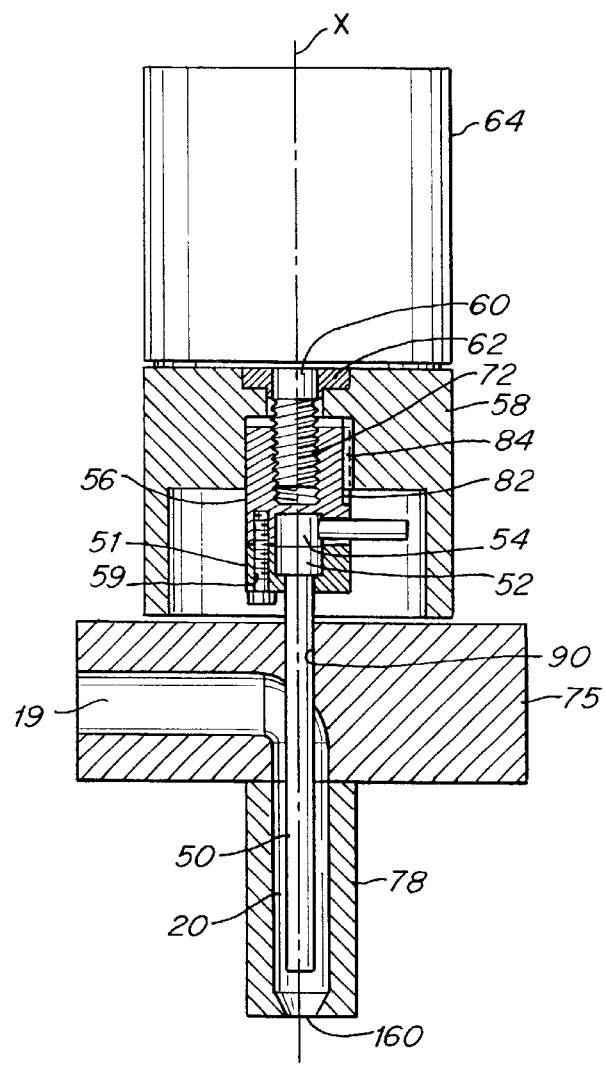
FIG. 2b is a cross section along lines B—B of FIG. 2a showing the shaft of an electric motor interconnected to an actuator screw with an axial force absorbing bearing mounted between the housing for the shaft and the housing for the nut and screw.

With reference to FIGS. 2a, 2b, an electrically driven motor drives a pin 50 along its axis without rotation as follows. The pin 50 has an pin head 52 interconnected via coupling components 51, 56 to a screw 72 which is screwably engaged within a complementary nut aperture within nut coupling component 56. As shown, the pin head 52 is interconnected to screw 72 outside the hot runner manifold 75 and the pin is slidably mounted in a complementary receiving aperture 90 within the manifold housing 75 such that the pin 50 is disposed within melt channel 20 for slidable movement along pin axis X which in the embodiment shown is coaxial with motor shaft 60. Nut component 56 is attached to coupling component 51 via bolting between apertures 59 as best shown in FIG. 5.

Figure 5:
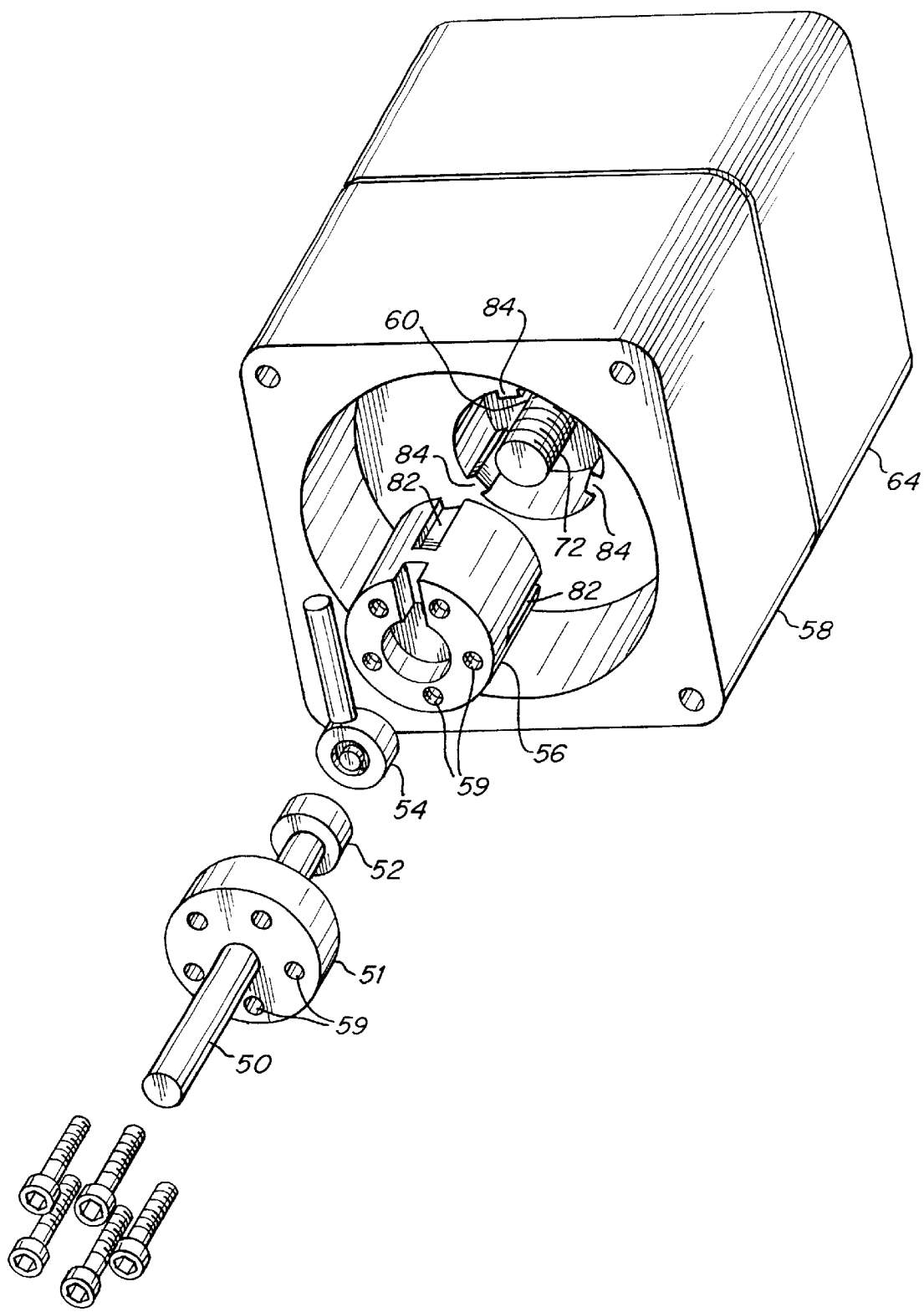
FIG. 5 is a close-up exploded isometric view of the pin, load cell, coupling and screw/nut components of the FIG. 4 apparatus.

As best shown in FIG. 5, nut component 56 has slots 82 into which keys 84 provided on mounting housing 58 slide so as to render nut component 56 non-rotatable with respect to coupling component 51, pin 50, housing 58 and motor housing 64.

Figures 3, 4:
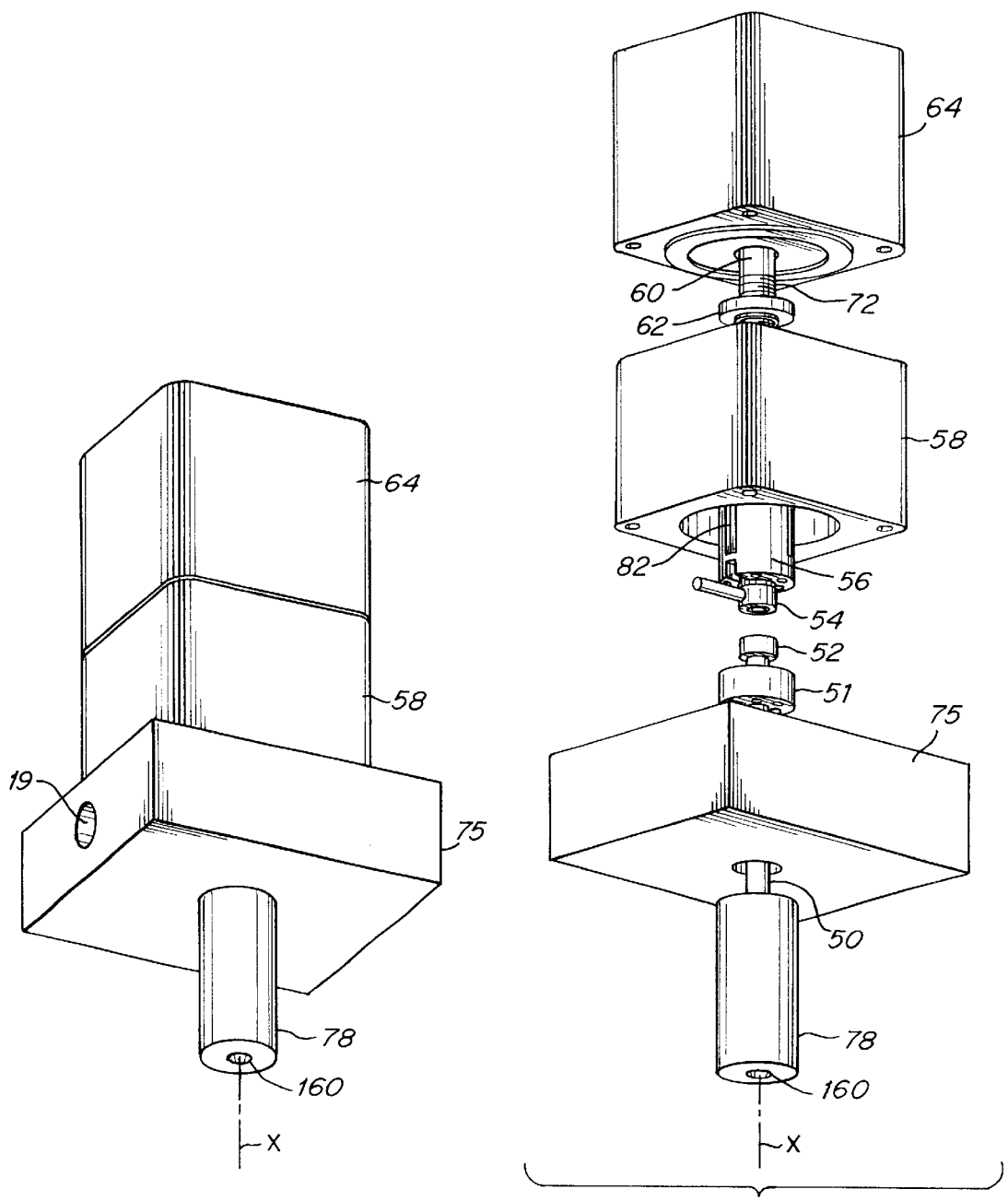
FIG. 3 is an isometric view of an assembled apparatus according to FIG. 2b.
FIG. 4 is an exploded isometric view of the FIG. 3 apparatus.

The rotatably driven shaft 60, FIGS. 2b, 5 of the motor (not shown) housed within housing 64 is coaxially aligned along axis X with screw 72 and pin 50 and is engaged with the top end of screw 72 such that when shaft 60 rotates screw 72 simultaneously rotates. As screw 72 rotates, nut 56 travels along axis X. Through the coupled interconnection of the end 52 of pin 50 with nut 56, pin 50 is simultaneously driven and travels along axis X together with the travel of nut 56 which thus acts together with screw 72 as an actuating mechanism for pin 50. As shown in FIGS. 2c, 4, 5, a load cell 54 may be included. As shown, the load cell is coupled to pin end 52 such that the pressure sensitive surface of the load cell 54 is snugly engaged with the top end surface of the end 52 of pin 50 such that axial force along axis X to which pin 50 is subject is sensed by load cell 54. In this embodiment, the force or pressure measured by the load cell 54 is preferably input as a value into a PID and/or other CPU program which controls the drive of the shaft 60 of the motor housed within 64. As shown in FIG. 2b a thrust bearing is mounted between shaft 60 and the housing 58 for screw 72/nut 56 so as to absorb axial force transmitted from pin 50 to nut 56 and screw 72 and thus substantially reduce and/or eliminate load on the shaft 60 of the motor along axis X. Such axial load would otherwise be transmitted to shaft 60 as a result of engagement of shaft 60 with screw 72.

Figure 5A:
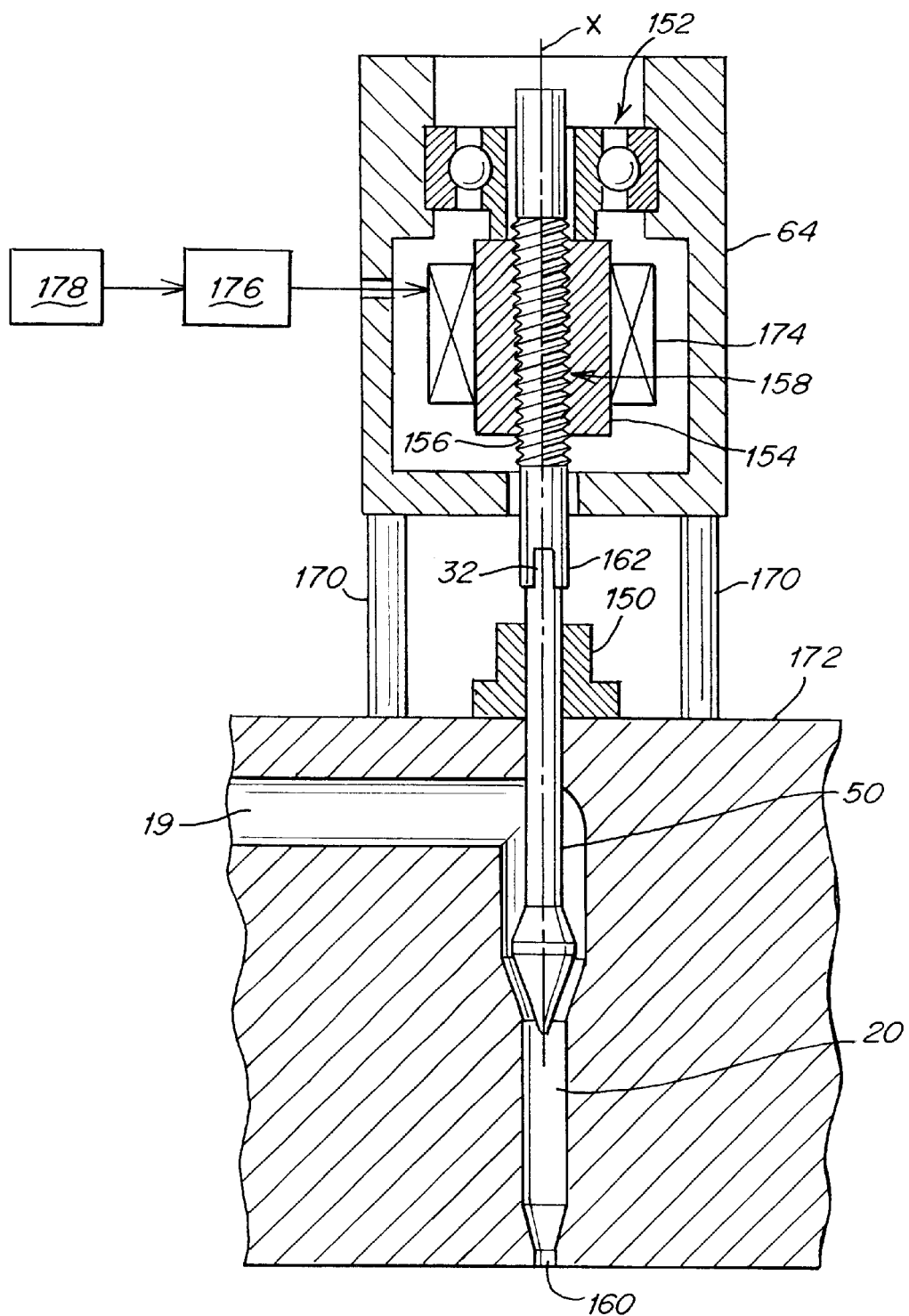
FIG. 5a is a schematic side cross sectional view showing another embodiment of the invention showing a screw screwably engaged with the rotor of a frameless motor, the screw being coaxially interconnected directly to a slidably movable pin with an axial force absorbing bearing mounted between the rotor and the housing for the rotor.

In an alternative embodiment shown in FIG. 5a, the end 162 of a screw 158 of an electrically driven motor is directly connected to the end 32 of a pin 50. In such an embodiment, the screw 158 and associated nut 154 act as an actuating mechanism. As shown, a portion of the length of the screw 158 is threaded with screw threads 156 which are screwably engaged within nut component 154. As schematically shown, nut component 154 is mounted against axial movement (along axis X) on or to bearing 152 which is in turn mounted against axial movement on or to motor housing 64 which is in turn mounted against axial movement to manifold 172. As schematically shown, nut 154 is mounted on or to the inner rotatable race of bearing 152 and is drivably rotated by electrical power input to coils 174 around axis X. As nut 154 is controllably rotated, screw 158 is controllably driven and travels along axis X and pin 50 is simultaneously driven and travels axially together with screw 158. As shown, pin 50 is slidably mounted in a complementary aperture in manifold 172 and a bushing 150 which seals against leakage of molten plastic. The pin 50 extends within melt channel 20 and is movable along its axis X without rotation. By virtue of the direct coaxial connection between screw 158 and pin 50, and the rigid mounting of nut 154 against axial movement to housing 64 and the rigid mounting against axial movement of housing 64 to manifold 172 via mounts 170, axial force to which the pin 50 is subject is transmitted axially to the rotor of the motor 64. To provide for absorption of such axial forces and to relieve the rotor of such load, the nut 154 is mounted in, on or to bearing 152 which is rigidly mounted to the housing of motor 64. Bearing 152 thus absorbs axial forces to which the screw 158 is subject. As shown, a controller 176 which receives signals representative of the output of a sensor 178 is provided having a program for executing an algorithm which controls the input of electrical power to servomotor coils 174 in a manner as described above with reference to FIGS. 1, 1a.

Figure 6A:
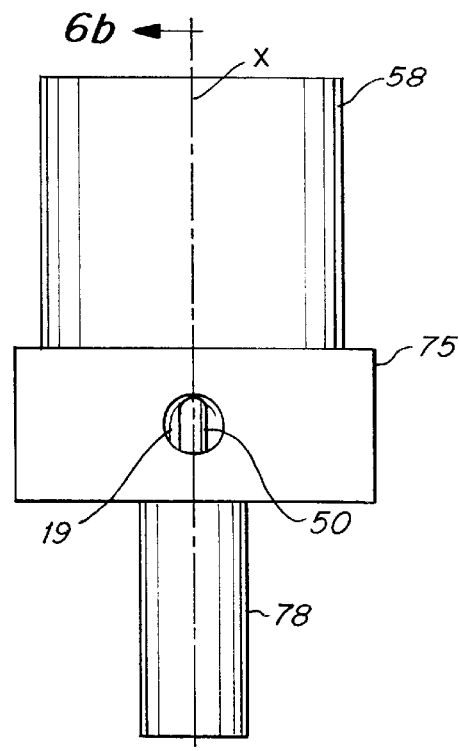
FIG. 6a is a side schematic view of another embodiment of the invention.
Figure 6B:
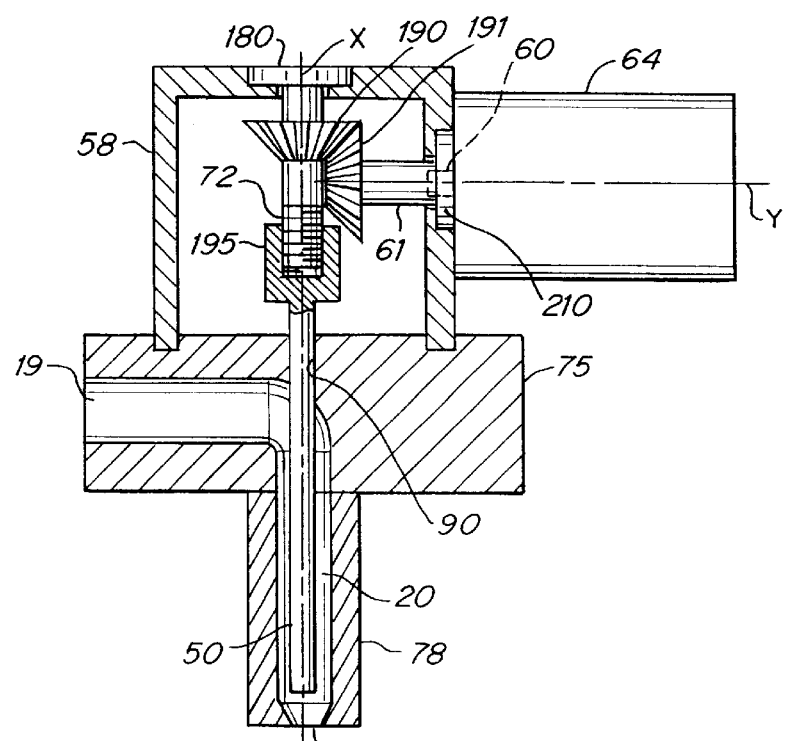
FIG. 6b is a side cross-sectional view along lines A—A of FIG. 6a showing a bevel gear interconnection between the rotor or a shaft of an electric motor and an actuator screw.
Figure 7:
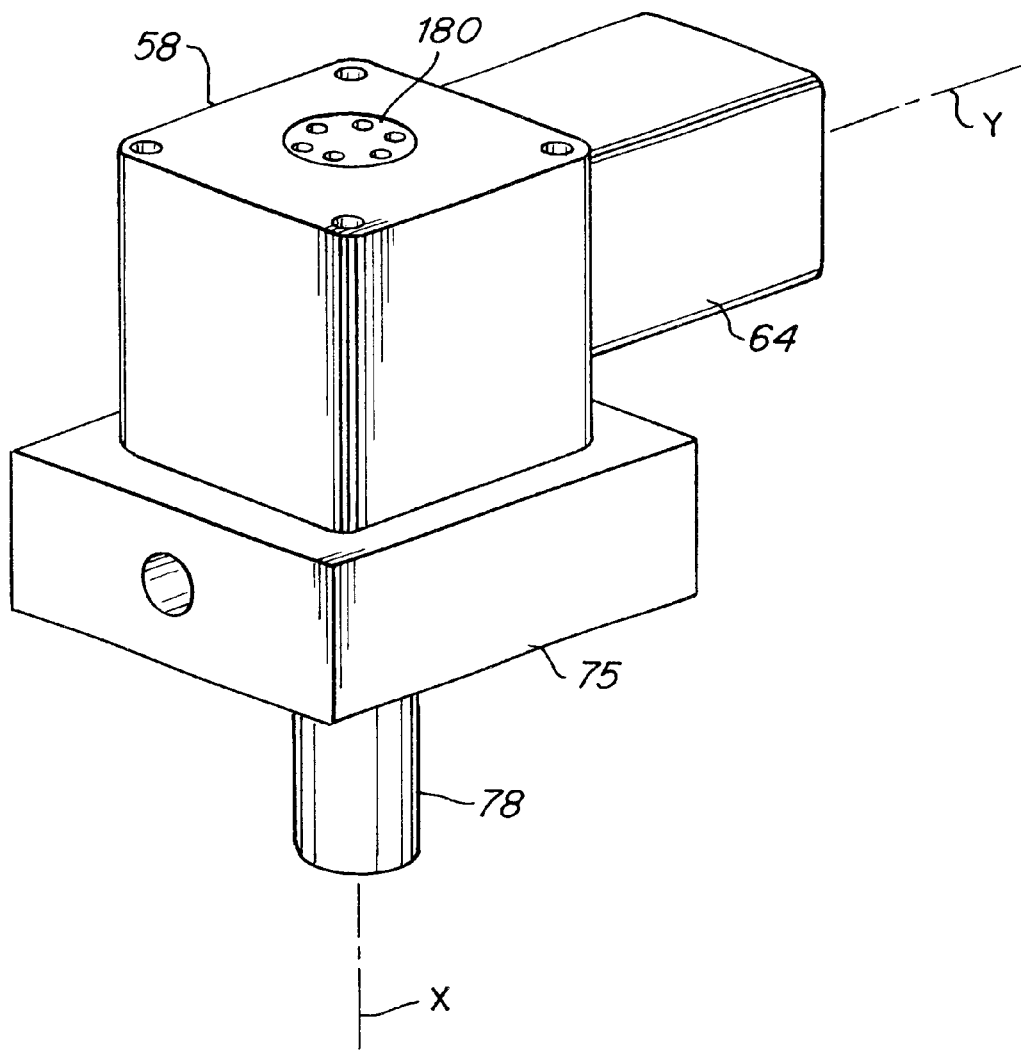
FIG. 7 is an isometric view of an assembled FIG. 6b apparatus.
Figure 8:
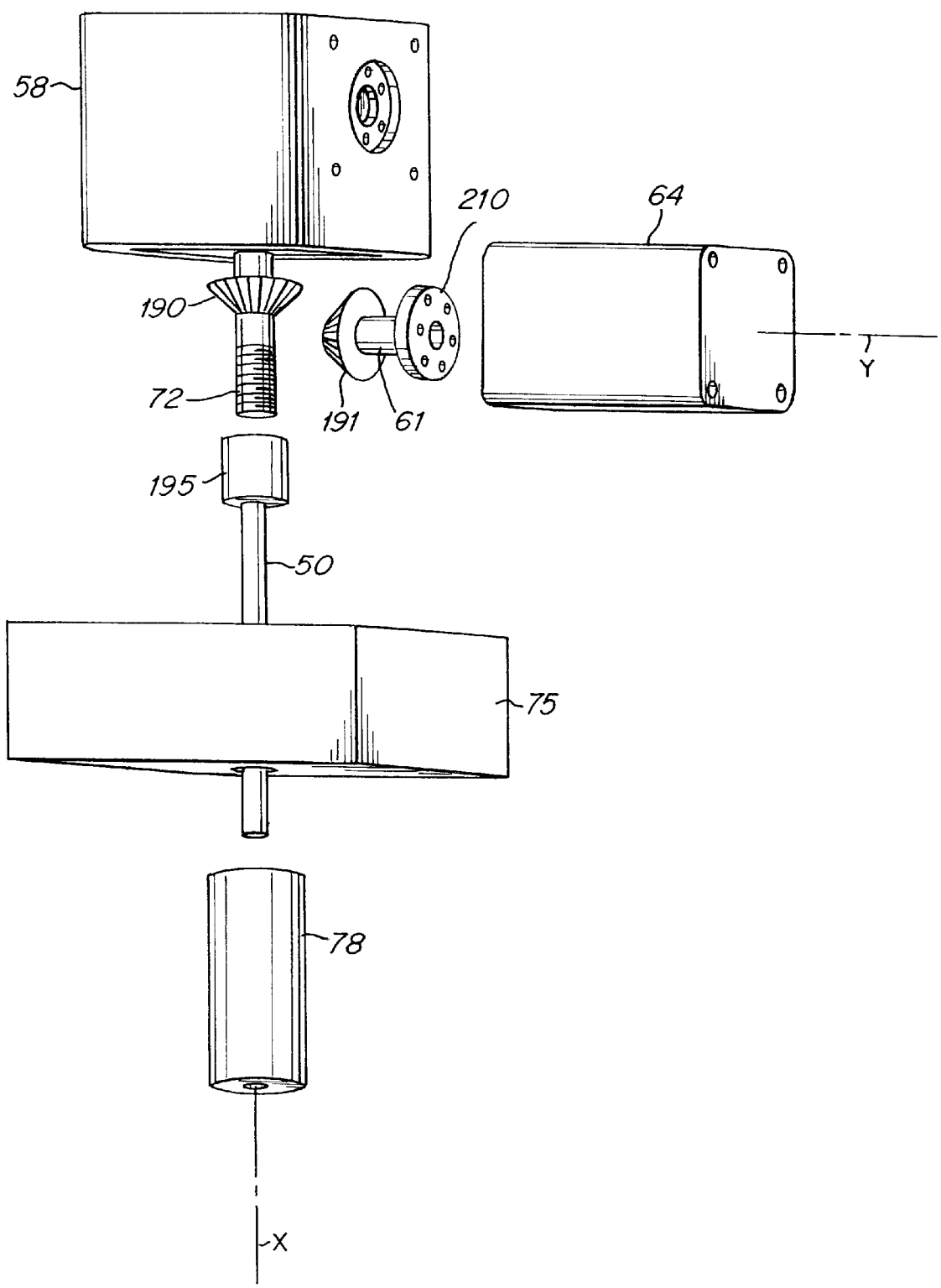
FIG. 8 is an exploded isometric view of the FIG. 7 apparatus.

FIGS. 6–8 show another embodiment of the present invention in which the shaft 60 of an electrically driven motor 64 is drivably interconnected to a slidably mounted pin 50 through a bevel gear engagement between the head 190 of a screw 72 and the head 191 of an extension member 61 of the motor shaft 60. As can be readily imagined, the screw component could alternatively have threads along its length (in place of the beveled head 190) which mesh with a worm at the end of extension 61 (in place of the beveled member 191). As shown, the axis Y of the shaft 60 is perpendicular to the axis X of the pin 50 and the actuating screw mechanism 72 such that axial forces which may occur along axis X are not transmitted along axis Y to the shaft 60.

In the FIGS. 6–8 embodiment, the pin 50 has a nut 195 integrally forming the end of the pin 50 which is drivably interconnected to, i.e. screwably engaged with, the actuating screw 72. The pin 50 is slidably mounted in a complementary aperture 90 within manifold 75 for movement along its axis X within melt flow channel 20. The actuating screw 72 is mounted via disc 180 to housing 58 which is, in turn, fixedly mounted to manifold 75 such that screw 72 is drivably rotatable around axis X and axially stationary along axis X. Screw 72 is drivably rotatable around axis X via the screwable engagement between bevel gears 190, 191. Shaft extension member 61 is coaxially connected to the motor shaft 60 (via rigid connection between connecting disc 210 and a complementary connecting member attached to shaft 60 which is not shown) such that as the shaft 60 is rotatably driven around axis Y the extension member 61 and its associated bevel gear 191 are simultaneously rotatably driven around axis Y. As can be readily imagined, as screw 72 is rotatably driven around axis X via the meshed bevel gears 190, 191, pin 50 is translationally driven along axis X via the screwable engagement between nut end 195 and screw 72. Thus the screw 72 acts as an actuating member to and through which axial forces are transmitted to and from pin 50. As described with reference to the previous embodiments, the electrically driven motor 64 may be interconnected to a controller which receives data/signals representative of melt flow or machine component conditions and has a predetermined algorithm for directing the drive of the motor according to the received data/signals and the predetermined algorithm, program or protocol.

What is claimed is:

1. In a method for operating an injection molding machine having a plastic melt flow channel with a pin slidably mounted within the channel, wherein the channel has an output end for delivering molten plastic injected into the channel under pressure to a mold cavity, and wherein the pin comprises an elongated rod having an axis and an end, the pin being slidably mounted for movement along its axis within the channel, a method for controllably driving movement of the pin along its axis comprising:

drivably interconnecting a rotatable central rotor of an electrically driven motor to an actuating mechanism which is drivably movable along a predetermined path of travel;

interconnecting the actuating mechanism to the end of the pin such that movement of the actuating mechanism along its predetermined path of travel simultaneously moves the pin along its axis according to a predetermined path of travel;

controllably driving the motor to controllably drive the actuating mechanism and to controllably drive the pin through its predetermined path of travel within the channel.

2. The method of claim 1 wherein the rotor of the motor translates rotational force to the pin to move the pin along its predetermined path of travel without rotation of the pin.

3. The method of claim 1 wherein the pin is subjected to forces along its axis by one or more of the actuating mechanism and the molten plastic, the method further comprising interconnecting the actuating mechanism to the end of the pin such that the axial forces to which the pin is subjected are transmit between the pin and the actuating mechanism without absorption.

4. The method of claim 3 wherein the actuating mechanism comprises a screw and a complementary nut screwably engaged with each other, at least one of the screw and the nut being drivably interconnected to the motor to travel along the predetermined path of travel of the actuating mechanism, the pin being simultaneously driven along its axis through its path of travel according to the predetermined path of travel of the screw or the nut.

5. The method of claim 1 wherein the motor includes a rotatably driven rotor having an axis and wherein the pin is subjected to forces along its axis by one or more of the actuating mechanism and the molten plastic, the method further comprising absorbing forces which are transmitted to the rotor along its axis.

6. The method of claim 5 wherein the actuating mechanism comprises a screw and a complementary nut screwably gaged with each other, at least one of the screw and the nut being drivably interconnected to the motor to travel along the predetermined path of travel of the actuating mechanism, the pin being simultaneously driven along its axis through its path of travel according to the predetermined path of travel of the screw or the nut.

7. The method of clam 1 wherein the actuating mechanism comprises a screw and a complementary nut screwably engaged with each other, at least one of the screw and the nut being drivably interconnected to the motor to travel along the predetermined path of travel of the actuating mechanism, the pin being simultaneously driven along its axis through its path of travel according to the predetermined path of travel of the screw or the nut.

8. The method of claim 1 further comprising sensing one or more selected conditions of one or more of the molten plastic and the injection molding machine and controlling the drive of the motor according to a predetermined algorithm utilizing a value for the sensed conditions.

9. The method of claim 1 further comprising sensing one or more conditions of the molten plastic selected from the group consisting of pressure, temperature, viscosity, force and flow rate of the molten plastic and controlling the drive of the motor according to a predetermined algorithm utilizing a value for the sensed conditions.

10. In a method of operating an injection molding system, a method of opening and closing a gate leading to a mold cavity comprising controllably driving, with an electrically powered motor, a pin which is slidably mounted within a channel leading to the gate along a predetermined path of axial travel in which the gate is closed by the pin in at least one position and opened by the pin in at another position along the predetermined path of travel.

11. In a method of operating an injection molding system, a method of dynamically altering the flow of molten plastic in a melt flow channel comprising controllably driving, with an electrically powered motor, a pin which is slidably mounted within the melt flow channel along predetermined path of axial travel in which the flow of the melt through the channel varies according to the position of the pin along the predetermined path of travel.

12. In an injection molding machine, an apparatus for controlling movement of a pin comprising:

a plastic melt flow channel having an output end for delivering molten plastic injected into the channel under pressure to a mold cavity, wherein the pin comprises an elongated rod having an axis and an end, the pin being slidably mounted within the channel for movement along its axis within the channel, an electrically driven motor drivably interconnected to an actuating mechanism, wherein the actuating mechanism is drivably interconnected to the end of the pin, the motor being controllably drivable to drive the pin through movement along its axis within the channel.

13. The apparatus of claim 12 wherein the motor includes a rotatably driven rotor which translates motion to the pin to drive the pin along its axis without rotation.

14. The apparatus of claim 12 wherein the pin is subjected to forces along its axis and wherein the actuating mechanism is interconnected to the end of the pin such that the axial forces to which the pin is subjected are transmitted between the pin and the actuating mechanism without absorption of the axial forces.

15. The apparatus of claim 12 wherein the motor includes a rotatably driven rotor having an axis and wherein the pin is subjected to forces along its axis, the apparatus further comprising a force absorbing member which absorbs forces transmitted to the rotor of the motor along its axis.

16. The apparatus of claim 12 wherein the actuating mechanism comprises a screw and a complementary nut screwably engaged with each other, at least one of the screw and the nut being drivably interconnected to the motor to travel along a predetermined path of travel, the pin being simultaneously driven along its axis through a path of travel according to the predetermined path of travel of the screw or the nut.

17. The apparatus of claim 14 wherein the actuating mechanism comprises a screw and a complementary nut screwably engaged with each other, at least one of the screw and the nut being drivably interconnected to the motor to travel along a predetermined path of travel, the pin being simultaneously driven along its axis through a path of travel according to the predetermined path of travel of the screw or the nut.

18. The apparatus of claim 15 wherein the actuating mechanism comprises a screw and a complementary nut screwably engaged with each other, at least one of the screw and the nut being drivably interconnected to the motor to travel along a predetermined path of travel, the pin being simultaneously driven along its axis through a path of travel according to the predetermined path of travel of the screw or the nut.

19. The apparatus of claim 12 wherein the motor is connected to a controller having a program for driving the movement of the actuating mechanism according to one or more sensed conditions of the molten plastic or the injection molding machine.

20. The apparatus of claim 12 wherein the motor is connected to a controller having a program for driving the movement of the actuating mechanism according to one or more of the pressure, temperature, viscosity, force and flow rate of the molten plastic, the position of a component of the machine and the time or time lapse of operation of the machine or a component of the machine.

21. The apparatus of claim 12 further comprising a sensor which senses a selected condition of the molten plastic or the injection molding machine and which generates signals representative of the sensed property, the controller having a program which controls the motor according to the generated signals.

22. The apparatus of claim 21 wherein the sensed condition is selected from the group consisting of pressure, temperature, viscosity and flow rate of the molten plastic.

23. In an injection molding machine, a plastic melt flow control valve apparatus comprising:
a plastic melt flow channel having an output end for delivering molten plastic injected into the channel under a selected pressure to a mold cavity;
an elongated valve pin having an axis and an end, the pin being slidably mounted within the channel for movement along its axis within the channel to control flow of the molten plastic;
an electrically driven motor drivably interconnected to an actuating mechanism, wherein the actuating mechanism is interconnected to the end of the pin, the motor being controllably drivable to drive the pin through movement along its axis within the channel.

24. The apparatus of claim 23 wherein the motor includes a rotatably driven rotor which translates motion to the pin to drive the pin along its axis without rotation.

25. The apparatus of claim 23 wherein the pin is subjected to forces along its axis and wherein the actuating mechanism is interconnected to the end of the pin such that the axial forces to which the pin is subjected are transmitted to the actuating mechanism.

26. The apparatus of claim 23 wherein the motor includes a rotatably driven central rotor having an axis and wherein the pin is subjected to forces along its axis, the apparatus further comprising a force absorbing member which absorbs forces transmitted to the rotor of the motor along its axis.

27. The apparatus of claim 23 wherein the actuating mechanism comprises a screw and a complementary nut screwably engaged with each other, at least one of the screw and the nut being drivably interconnected to the motor to travel along a predetermined path of travel, the pin being simultaneously driven along its axis through a path of travel according to the predetermined path of travel of the screw or the nut.

28. The apparatus of claim 25 wherein the actuating mechanism comprises a screw and a complementary nut screwably engaged with each other, at least one of the screw and the nut being drivably interconnected to the motor to travel along a predetermined path of travel, the pin being simultaneously driven along its axis through a path of travel according to the predetermined path of travel of the screw or the nut.

29. The apparatus of claim 26 wherein the actuating mechanism comprises a screw and a complementary nut screwably engaged with each other, at least one of the screw and the nut being drivably interconnected to motor to travel along a predetermined path of travel, the pin being simultaneously driven along its axis through a path of travel according to the predetermined path of travel of the screw or the nut.

30. The apparatus of claim 23 wherein the motor is connected to a controller having a program for driving the movement of the actuating mechanism according to one or more sensed conditions of the molten plastic or the injection molding machine.

31. The apparatus of claim 23 wherein the motor is connected to a controller having a program for driving the movement of the actuating mechanism according to one or more of the pressure, temperature, viscosity, force and flow rate of the molten plastic, the position of a component of the machine and the time or time lapse of operation of the machine or a component of the machine.

32. The apparatus of claim 23 further comprising a sensor which senses a selected condition of the molten plastic or the injection molding machine and which generates signals representative of the sensed condition, the controller having a program which receives the generated signals and controls the motor according to the generated signals.

33. The apparatus of claim 32 wherein the sensed condition is selected from the group consisting of pressure, temperature, viscosity and flow rate of the molten plastic.

34. In an injection molding machine, an apparatus for controlling movement of a pin to open and close a gate leading a mold cavity comprising:
a plastic melt flow channel having an output end for delivering molten plastic injected into the channel under pressure to the gate, wherein the pin comprises an elongated rod having an axis and an end, the pin being slidably mounted within the channel for movement along its axis within the channel,
an electrically driven motor drivably interconnected to an actuating mechanism, wherein the actuating mechanism is interconnected to the end of the pin, the motor being controllably drivable to drive the pin through movement along its axis within the channel.

35. In an injection molding machine, an apparatus for controlling movement of a pin to control rate of flow of molten plastic within a melt flow channel comprising:
a plastic melt flow channel having an output end for delivering molten plastic injected into the channel under pressure to a mold cavity, wherein the pin comprises an elongated rod having an axis and end, the pin being slidably mounted within the channel for movement along its axis along determined path of travel within the channel, wherein the position of the pin along its path of travel controls the rate of flow of the molten plastic through the channel;
an electrically driven motor drivably interconnected to an actuating mechanism, wherein the actuating mechanism is interconnected to the end of the pin, the motor being controllably drivable to controllably drive the pin along its axis along its predetermined path of travel within the channel.

* * * * *

UNITED STATES PATENT AND TRADEMARK OFFICE
CERTIFICATE OF CORRECTION

PATENT NO.   : 6,294,122 B1                                     Page 1 of 1
DATED        : September 25, 2001
INVENTOR(S)  : Mark Moss, David Kazmer, James R. Rinderle, and Christopher Lee It is certified that error appears in the above-identified patent and that said Letters Patent is hereby corrected as shown below:

Column 11, claim 3,
Line 16, "transmit" should read -- transmitted --.

Column 14, claim 34,
Line 28, "leading a" should read -- leading to a --.

Column 14, claim 35,
Line 46, "and end" should read -- and an end --.
Line 48, "along determined" should read -- along a predetermined --.

Signed and Sealed this

Fifth Day of March, 2002

Attest:

JAMES E. ROGAN
Attesting Officer         Director of the United States Patent and Trademark Office

US006294122C1

(12) EX PARTE REEXAMINATION CERTIFICATE (10161st)

United States Patent
Moss et al.

(10) Number: US 6,294,122 C1
(45) Certificate Issued: May 14, 2014

(54) ELECTRIC ACTUATOR FOR A MELT FLOW CONTROL PIN

(75) Inventors: Mark Moss, Boxford, MA (US); David Kazmer, Amherst, MA (US); Christopher Lee, Burlington, MA (US)

(73) Assignee: The Royal Bank of Scotland PLC, New York, NY (US)

Reexamination Request:
No. 90/012,970, Sep. 5, 2013

Reexamination Certificate for:
Patent No.: 6,294,122
Issued: Sep. 25, 2001
Appl. No.: 09/187,974
Filed: Nov. 6, 1998

Certificate of Correction issued Mar. 5, 2002

Related U.S. Application Data

(60) Provisional application No. 60/090,750, filed on Jun. 26, 1998.

(51) Int. Cl.
- *B29C 45/27* (2006.01)
- *B29C 45/48* (2006.01)
- *B29C 45/30* (2006.01)

(52) U.S. Cl.
USPC .................. 264/328.9; 425/564; 425/566

(58) Field of Classification Search
None
See application file for complete search history.

(56) References Cited

To view the complete listing of prior art documents cited during the proceeding for Reexamination Control Number 90/012,970, please refer to the USPTO's public Patent Application Information Retrieval (PAIR) system under the Display References tab.

*Primary Examiner* — Christina Y Leung

(57) ABSTRACT

In an injection molding machine, an apparatus for controlling movement of a pin comprising a plastic melt flow channel having an output end for delivering molten plastic injected into the channel under pressure to a mold cavity, wherein the pin comprises an elongated rod having an axis and an end, the pin being slidably mounted within the channel for movement along its axis within the channel, an electrically driven motor drivably interconnected to an actuating mechanism, wherein the actuating mechanism is drivably interconnected to the end of the pin, the motor being controllably drivable to drive the pin through movement along its axis within the channel.

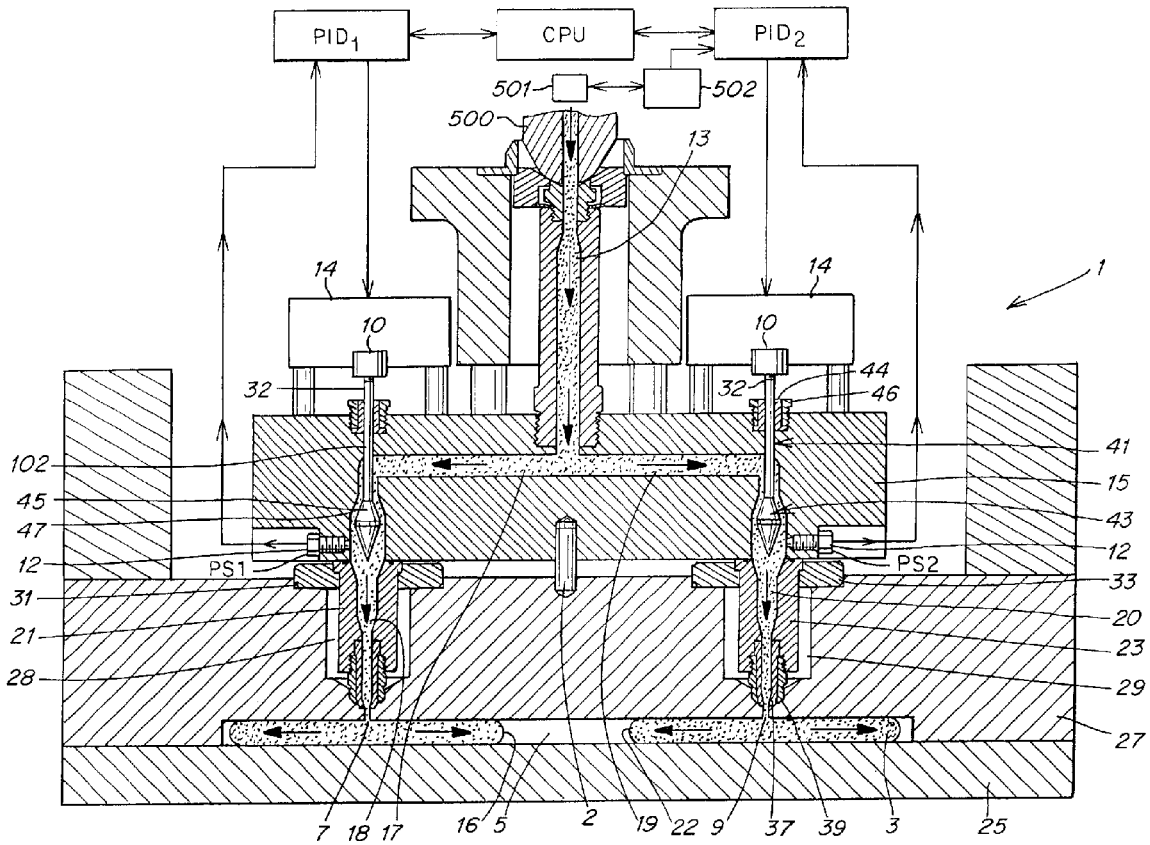

1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10-12, 23, 34 and 35 are determined to be patentable as amended.

Claims 2-9, 13-22 and 24-33, dependent on an amended claim, are determined to be patentable.

New claims 36-59 are added and determined to be patentable.

1. In a method for operating an injection molding machine having a plastic melt flow channel with a pin slidably mounted within the channel, wherein the channel has an output end for delivering molten plastic injected into the channel under pressure to a mold cavity, and wherein the pin comprises an elongated rod having an axis and an end, the pin being slidably mounted for movement along its axis within the channel, a method for controllably driving movement of the pin along its axis comprising:

drivably interconnecting a rotatable central rotor of an electrically driven motor to an actuating mechanism which is drivably movable along a predetermined path of travel *that includes a fully closed position where the rate of flow of the molten plastic is stopped, a fully open position at which rate of flow is fully open and variable positions intermediate the fully open and fully closed positions at which rate of flow of the molten plastic varies between stopped and fully open*;

interconnecting the actuating mechanism to the end of the pin such that movement of the actuating mechanism along its predetermined path of travel simultaneously moves the pin along its axis according to a predetermined path of travel;

controllably driving the motor to controllably drive the actuating mechanism and to controllably drive the pin through its predetermined path of travel within the channel *through one or more of the intermediate positions to controllably vary the rate of flow of molten plastic between stopped and fully open during the course of an injection cycle*.

10. In a method of operating an injection molding system, a method of opening and closing a gate [leading] to *inject molten plastic at variable rates of flow into* a mold cavity comprising controllably driving, with an electrically powered motor, a pin which is slidably mounted within a channel leading to the gate along a predetermined path of axial travel in which the gate is closed by the pin in at least one position and opened by the pin in at *least* another position along the predetermined path of travel *and the gate is partially opened between closed and open by controlled positioning of the pin intermediate the gate closed and gate opened positions along the predetermined path of travel to controllably vary the rate of flow of the molten plastic via controlled operation of the electrically powered motor*.

11. In a method of operating an injection molding system, a method of dynamically altering the *rate of* flow of molten plastic in a melt flow channel comprising controllably driving, with an electrically powered motor, a pin which is slidably mounted within the melt flow channel along predetermined path of axial travel in which the *rate of* flow of the [melt] *molten plastic* through the channel controllably varies between stopped, fully open and one or more rates intermediate stopped and fully open according to the [position] *controlled positioning* of the pin along the predetermined path of travel *during an injection cycle*.

12. In an injection molding machine, an apparatus for controlling movement of a pin comprising:

a plastic melt flow channel having an output end for delivering molten plastic injected into the channel under pressure to a mold cavity, wherein the pin comprises an elongated rod having an axis and an end, the pin being slidably mounted within the channel for movement along its axis within the channel, an electrically driven motor drivably interconnected to an actuating mechanism, wherein the actuating mechanism is drivably interconnected to the end of the pin, the motor being controllably drivable to drive the pin through movement along its axis within the channel, *such that the pin is drivable through a fully closed position where the rate of flow of the molten plastic is stopped, a fully open position at which rate of flow is fully open and variable positions intermediate the fully open and fully closed positions at which rate of flow of the molten plastic varies between stopped and fully open*.

23. In an injection molding machine, a plastic melt flow control valve apparatus comprising:

a plastic melt flow channel having an output end for delivering molten plastic injected into the channel under a selected pressure to a mold cavity;

an elongated valve pin having an axis and an end, the pin being slidably mounted within the channel for movement along its axis within the channel to control flow of the molten plastic;

an electrically driven motor drivably interconnected to an actuating mechanism, wherein the actuating mechanism is interconnected to the end of the pin, the motor being controllably drivable to drive the pin through *a predetermined path of* movement along its axis within the channel *that controllably varies the rate of flow of molten plastic between fully stopped, fully open and one or more predetermined rates intermediate fully stopped and fully open during the course of an injection cycle*.

34. In an injection molding machine, an apparatus for controlling movement of a pin to open and close a gate leading a mold cavity comprising:

a plastic melt flow channel having an output end for delivering molten plastic injected into the channel under pressure to the gate, wherein the pin comprises an elongated rod having an axis and an end, the pin being slidably mounted within the channel for movement along its axis within the channel, an electrically driven motor drivably interconnected to an actuating mechanism, wherein the actuating mechanism is interconnected to the end of the pin, the motor being controllably drivable to drive the pin through *a predetermined path of* movement along its axis within the channel *that controllably varies the rate of flow of molten plastic between fully stopped, fully open and one or more predetermined rates intermediate fully stopped and fully open during the course of an injection cycle*.

35. In an injection molding machine, an apparatus for controlling movement of a pin to control rate of flow of molten plastic within a melt flow channel comprising:
- a plastic melt flow channel having an output end for delivering molten plastic injected into the channel under pressure to a mold cavity, wherein the pin comprises an elongated rod having an axis and end, the pin being slidably mounted within the channel for movement along its axis along determined path of travel within the channel, wherein the position of the pin along its path of travel controls the rate of flow of the molten plastic through the channel *between fully stopped, fully open and one or more rates intermediate fully stopped and fully open*;
- an electrically driven motor drivably interconnected to an actuating mechanism, wherein the actuating mechanism is interconnected to the end of the pin, the motor being controllably drivable to controllably drive the pin along its axis along its predetermined path of travel within the channel *to controllably vary the rate of flow of molten plastic between fully open, fully stopped and one or more rate of flow intermediate fully open and fully stopped*.

36. In a method for operating an injection molding machine having a plastic melt flow channel with a pin slidably mounted within the channel, wherein the channel has an output end for delivering molten plastic injected into the channel under pressure to a mold cavity, and wherein the pin comprises an elongated rod having an axis and an end, the pin being slidably mounted for movement along its axis within the channel, a method for controllably driving movement of the pin along its axis comprising:
- drivably interconnecting a rotatable central rotor of an electrically driven motor to an actuating mechanism which is drivably movable along a predetermined path of travel;
- interconnecting the actuating mechanism to the end of the pin such that movement of the actuating mechanism along its predetermined path of travel simultaneously moves the pin along its axis according to a predetermined path of travel;
- controllably driving the motor to controllably drive the actuating mechanism and to controllably drive the pin through its predetermined path of travel within the channel,
- *wherein the pin is slidably mounted in a complementary aperture in a distribution manifold for movement of the pin along its axis through a flow channel section disposed in the distribution manifold.*

37. The method of claim 36 wherein the motor is controllably driven according to an algorithm that controllably varies rate of flow of the molten plastic to the mold cavity between fully stopped, fully open and one or more rates of flow intermediate fully open and fully stopped during an injection cycle.

38. *In a method of operating an injection molding system, a method of opening and closing a gate leading to a mold cavity comprising controllably driving, with an electrically powered motor, a pin which is slidably mounted within a channel leading to the gate along predetermined path of axial travel in which the gate is closed by the pin in at least one position and opened by the pin in at least another position along the predetermined path of travel*
- *wherein the pin is slidably mounted in a complementary aperture in a distribution manifold for movement of the pin along its axis through a flow channel section disposed in the distribution manifold.*

39. *The method of claim 38 wherein the motor is controllably driven according to an algorithm that controllably varies rate of flow of an injected molten fluid to the mold cavity between fully stopped, fully open and one or more rates of flow intermediate fully open and fully stopped during an injection cycle.*

40. *In an injection molding machine, an apparatus for controlling movement of a pin comprising:*
- *a plastic melt flow channel having an output end for delivering molten plastic injected into the channel under pressure to a mold cavity, wherein the pin comprises an elongated rod having an axis and an end, the pin being slidably mounted within the channel for movement along its axis within the channel,*
- *an electrically driven motor drivably interconnected to an actuating mechanism, wherein the actuating mechanism is drivably interconnected to the end of the pin, the motor being controllably drivable to drive the pin through movement along its axis within the channel,*
- *wherein the pin is slidably mounted in a complementary aperture in a distribution manifold for movement of the pin along its axis through a flow channel section disposed in the distribution manifold.*

41. *The apparatus of claim 40 wherein the motor is controllably driven according to an algorithm that controllably varies rate of flow of an injected molten fluid to the mold cavity between fully stopped, fully open and one or more rates of flow intermediate fully open and fully stopped during an injection cycle.*

42. *In an injection molding machine, a plastic melt flow control valve apparatus comprising:*
- *a plastic melt flow channel having an output end for delivering molten plastic injected into the channel under a selected pressure to a mold cavity;*
- *an elongated valve pin having an axis and an end, the pin being slidably mounted within the channel for movement along its axis within the channel to control flow of the molten plastic;*
- *an electrically driven motor drivably interconnected to an actuating mechanism, wherein the actuating mechanism is interconnected to the end of the pin, the motor being controllably drivable to drive the pin through movement along its axis within the channel,*
- *wherein the pin is slidably mounted in a complementary aperture in a distribution manifold for movement of the pin along its axis through a flow channel section disposed in the distribution manifold.*

43. *The apparatus of claim 42 wherein the motor is controllably driven according to an algorithm that controllably varies rate of flow of an injected molten fluid to the mold cavity between fully stopped, fully open and one or more rates of flow intermediate fully open and fully stopped during an injection cycle.*

44. *In an injection molding machine, an apparatus for controlling movement of a pin to open and close a gate leading a mold cavity comprising:*
- *a plastic melt flow channel having an output end for delivering molten plastic injected into the channel under pressure to the gate, wherein the pin comprises an elongated rod having an axis and an end, the pin being slidably mounted within the channel for movement along its axis within the channel,*
- *an electrically driven motor drivably interconnected to an actuating mechanism, wherein the actuating mechanism is interconnected to the end of the pin, the motor being controllably drivable to drive the pin through movement along its axis within the channel,* wherein the pin is slidably mounted in a complementary aperture in a distribution manifold for movement of the pin along its axis through a flow channel section disposed in the distribution manifold.

45. The apparatus of claim 44 wherein the motor is controllably driven according to an algorithm that controllably varies rate of flow of the molten plastic to the mold cavity between fully stopped, fully open and one or more rates of flow intermediate fully open and fully stopped during an injection cycle.

46. In an injection molding machine, an apparatus for controlling movement of a pin to control rate of flow of molten plastic within a melt flow channel comprising:
   a plastic melt flow channel having an output end for delivering molten plastic injected into the channel under pressure to a mold cavity, wherein the pin comprises an elongated rod having an axis and end, the pin being slidably mounted within the channel for movement along its axis along determined path of travel within the channel, wherein the position of the pin along its path of travel controls the rate of flow of the molten plastic through the channel;
   an electrically driven motor drivably interconnected to an actuating mechanism, wherein the actuating mechanism is interconnected to the end of the pin, the motor being controllably drivable to controllably drive the pin along its axis along its predetermined path of travel within the channel,
   wherein the pin is slidably mounted in a complementary aperture in a distribution manifold for movement of the pin along its axis through a flow channel section disposed in the distribution manifold.

47. The apparatus of claim 46 wherein the motor is controllably driven according to an algorithm that controllably varies rate of flow of the molten plastic to the mold cavity between fully stopped, fully open and one or more rates of flow intermediate fully open and fully stopped during an injection cycle.

48. In a method for operating an injection molding machine having a plastic melt flow channel with a pin slidably mounted within the channel, wherein the channel has an output end for delivering molten plastic injected into the channel under pressure to a mold cavity, and wherein the pin comprises an elongated rod having an axis and an end, the pin being slidably mounted for movement along its axis within the channel, a method for controllably driving movement of the pin along its axis comprising:
   drivably interconnecting a rotatable central rotor of an electrically driven motor to an actuating mechanism which is drivably movable along a predetermined path of travel;
   interconnecting the actuating mechanism to the end of the pin such that movement of the actuating mechanism along its predetermined path of travel simultaneously moves the pin along its axis according to a predetermined path of travel;
   controllably driving the motor to controllably drive the actuating mechanism and to controllably drive the pin through its predetermined path of travel within the channel,
   wherein the motor is controllably driven according to an algorithm that controllably varies rate of flow of the molten plastic to the mold cavity between fully stopped, fully open and one or more rates of flow intermediate fully open and fully stopped during an injection cycle.

49. A method of operating an injection molding system, a method of opening and closing a gate leading to a mold cavity comprising controllably driving, with an electrically powered motor, a pin which is slidably mounted within a channel leading to the gate along a predetermined path of axial travel in which the gate is closed by the pin in at least one position and opened by the pin in at least another position along the predetermined path of travel, wherein the motor is controllably driven according to an algorithm that controllably varies rate of flow of an injected molten fluid to the mold cavity between fully stopped, fully open and one or more rates of flow intermediate fully open and fully stopped during an injection cycle.

50. In an injection molding machine, an apparatus for controlling movement of a pin comprising:
   a plastic melt flow channel having an output end for delivering molten plastic injected into the channel under pressure to a mold cavity, wherein the pin comprises an elongated rod having an axis and an end, the pin being slidably mounted within the channel for movement along its axis within the channel,
   an electrically driven motor drivably interconnected to an actuating mechanism, wherein the actuating mechanism is drivably interconnected to the end of the pin, the motor being controllably drivable to drive the pin through movement along its axis within the channel,
   wherein the motor is controllably driven according to an algorithm that controllably varies rate of flow of the molten plastic to the mold cavity between fully stopped, fully open and one or more rates of flow intermediate fully open and fully stopped during an injection cycle.

51. In an injection molding machine, a plastic melt flow control valve apparatus comprising:
   a plastic melt flow channel having an output end for delivering molten plastic injected into the channel under a selected pressure to a mold cavity;
   an elongated valve pin having an axis and an end, the pin being slidably mounted within the channel for movement along its axis within the channel to control flow of the molten plastic;
   an electrically driven motor drivably interconnected to an actuating mechanism, wherein the actuating mechanism is interconnected to the end of the pin, the motor being controllably drivable to drive the pin through movement along its axis within the channel,
   wherein the motor is controllably driven according to an algorithm that controllably varies rate of flow of the molten plastic to the mold cavity between fully stopped, fully open and one or more rates of flow intermediate fully open and fully stopped during an injection cycle.

52. In an injection molding machine, an apparatus for controlling movement of a pin to open and close a gate leading a mold cavity comprising:
   a plastic melt flow channel having an output end for delivering molten plastic injected into the channel under pressure to the gate, wherein the pin comprises an elongated rod having an axis and an end, the pin being slidably mounted within the channel for movement along its axis within the channel,
   an electrically driven motor drivably interconnected to an actuating mechanism, wherein the actuating mechanism is interconnected to the end of the pin, the motor being controllably drivable to drive the pin through movement along its axis within the channel,
   wherein the motor is controllably driven according to an algorithm that controllably varies rate of flow of the molten plastic to the mold cavity between fully stopped, fully open and one or more rates of flow intermediate fully open and fully stopped during an injection cycle.

53. In an injection molding machine, an apparatus for controlling movement of a pin to control rate of flow of molten plastic within a melt flow channel comprising:

a plastic melt flow channel having an output end for delivering molten plastic injected into the channel under pressure to a mold cavity, wherein the pin comprises an elongated rod having an axis and end, the pin being slidably mounted within the channel for movement along its axis along determined path of travel within the channel, wherein the position of the pin along its path of travel controls the rate of flow of the molten plastic through the channel;

an electrically driven motor drivably interconnected to an actuating mechanism, wherein the actuating mechanism is interconnected to the end of the pin, the motor being controllably drivable to controllably drive the pin along its axis along its predetermined path of travel within the channel, wherein the motor is controllably driven according to an algorithm that controllably varies rate of flow of the molten plastic to the mold cavity between fully stopped, fully open and one or more rates of flow intermediate fully open and fully stopped during an injection cycle.

54. The method of claim 1 wherein the pin is slidably mounted in a complementary aperture in a distribution manifold for movement of the pin along its axis through a flow channel section disposed in the distribution manifold.

55. The method of claim 54 wherein the motor is controllably driven according to an algorithm that controllably varies rate of flow of the molten plastic to the mold cavity between fully stopped, fully open and one or more rates of flow intermediate fully open and fully stopped during an injection cycle.

56. The method of claim 1 wherein the motor is controllably driven according to an algorithm that controllably varies rate of flow of the molten plastic to the mold cavity between fully stopped, fully open and one or more rates of flow intermediate fully open and fully stopped during an injection cycle.

57. The apparatus of claim 23 wherein the pin is slidably mounted in a complementary aperture in a distribution manifold for movement of the pin along its axis through a flow channel section disposed in the distribution manifold.

58. The apparatus of claim 57 wherein the motor is controllably driven according to an algorithm that controllably varies rate of flow of the molten plastic to the mold cavity between fully stopped, fully open and one or more rates of flow intermediate fully open and fully stopped during an injection cycle.

59. The apparatus of claim 23 wherein the motor is controllably driven according to an algorithm that controllably varies rate of flow of the molten plastic to the mold cavity between fully stopped, fully open and one or more rates of flow intermediate fully open and fully stopped during an injection cycle.

* * * * *